US008957883B2

(12) United States Patent
Maruyama et al.

(10) Patent No.: US 8,957,883 B2
(45) Date of Patent: Feb. 17, 2015

(54) DISPLAY DEVICE

(75) Inventors: Junichi Maruyama, Mobara (JP); Koji Hosogi, Hiratsuka (JP); Goki Toshima, Chiba (JP); Misa Owa, Kokubunji (JP); Naruhiko Kasai, Yokohama (JP); Kikuo Ono, Mobara (JP)

(73) Assignees: Japan Display Inc., Tokyo (JP); Panasonic Liquid Crystal Display Co., Ltd., Himeji-shi (JP)

( * ) Notice: Subject to any disclaimer, the term of this patent is extended or adjusted under 35 U.S.C. 154(b) by 1211 days.

(21) Appl. No.: 12/844,923

(22) Filed: Jul. 28, 2010

(65) Prior Publication Data

US 2011/0032231 A1 Feb. 10, 2011

(30) Foreign Application Priority Data

Aug. 6, 2009 (JP) ................................ 2009-183309

(51) Int. Cl.

*G06F 3/00* (2006.01)
*G09G 5/00* (2006.01)
*G09G 3/20* (2006.01)
*G09G 3/36* (2006.01)

(52) U.S. Cl.

CPC ............ *G09G 3/2096* (2013.01); *G09G 3/3666* (2013.01); *G09G 2310/0221* (2013.01); *G09G 2310/04* (2013.01); *G09G 2320/0247* (2013.01); *G09G 2320/10* (2013.01); *G09G 2330/021* (2013.01); *G09G 2340/0435* (2013.01)

USPC ............................................................ 345/208

(58) Field of Classification Search

None

See application file for complete search history.

(56) References Cited

U.S. PATENT DOCUMENTS

| | | | | |
|---|---|---|---|---|
| 2003/0103018 | A1* | 6/2003 | Yokota et al. | 345/59 |
| 2004/0051706 | A1* | 3/2004 | Nakano et al. | 345/204 |
| 2007/0152945 | A1 | 7/2007 | Park et al. | |
| 2009/0213106 | A1* | 8/2009 | Sugamata | 345/211 |

FOREIGN PATENT DOCUMENTS

| | | | |
|---|---|---|---|
| JP | 04-302289 | | 10/1992 |
| JP | 2000-132134 | | 5/2000 |
| JP | 2000-321551 | | 11/2000 |
| JP | 2000321551 | A * | 11/2000 |
| JP | 2004-045748 | | 2/2004 |
| JP | 2004-177575 | | 6/2004 |
| JP | 2004177575 | A * | 6/2004 |
| JP | 2007-183545 | | 7/2007 |

* cited by examiner

*Primary Examiner* — Grant Sitta
*Assistant Examiner* — Kirk Hermann
(74) *Attorney, Agent, or Firm* — Antonelli, Terry, Stout & Kraus, LLP.

(57) ABSTRACT

A display device includes a frame frequency conversion circuit configured to convert a frame frequency of an input display data and a timing control circuit configured to control a first drive circuit and a second drive circuit based on a frame frequency after the conversion. The display device generates at least two display areas on the display panel. The at least two display areas display images at different frame frequencies. The display device further includes a switch unit configured to display an image at the frame frequency before the conversion at one of the at least two display areas and configured to display an image at the frame frequency after the conversion at another one of the at least two display areas. At least one of a boundary position and a size of the at least two display areas varies with time.

9 Claims, 16 Drawing Sheets

DISPLAY DEVICE

CROSS-REFERENCE TO RELATED APPLICATION

The present application claims priority from Japanese patent application JP 2009-183309 filed on Aug. 6, 2009, the content of which is hereby incorporated by reference into this application.

BACKGROUND OF THE INVENTION

1. Field of the Invention

The present invention relates to a display device, and more particularly, to a display device increasing a driving frequency of a display image in order to improve performance for displaying moving image.

2. Description of the Related Art

In view of displaying moving image, display devices are roughly categorized into impulse type display devices and hold type display devices. The impulse type display device, typified by a cathode ray tube display device, is of a type in which brightness of scanned pixels is increased only for period for the scanning and is decreased immediately after the scanning. The hold type display device, typified by a liquid crystal display device, is of a type that continues to keep brightness based on display data until next scanning.

The hold type display device advantageously obtains excellent display quality without flicker when displaying still image, but has a problem that when displaying moving image, a periphery of a moving object appears to be blurred, that is, so-called motion blur occurs to decrease display quality significantly. The reason why the motion blur occurs is due to a so-called retinal after-image, which is a phenomenon that, when an observer moves his/her line of sight along with the motion of the object, the observer interpolates display images before and after the motion with respect to a display image whose brightness is held. Therefore, even if a response speed of the display device is improved as much as possible, the motion blur cannot disappear completely.

As one of the known measures against such a problem, Japanese Patent Application Laid-open No. Hei 04-302289 discloses a technology of interpolating sub-frame images so that a frame frequency of a display image may be increased to resolve the above-mentioned motion blur (nx-speed drive). However, a response speed of liquid crystal greatly depends on temperature, and in particular under low temperature, the input signal following capability is extremely deteriorated to increase response time. If internal temperature of the device is low, a subsequent sub-frame image starts to be written before the liquid crystal responds completely to obtain target brightness. As a result, there arises a more severe problem that an after-image, such as tailing, occurs to cause image quality degradation in the display image.

As measures against the problem, Japanese Patent Application Laid-open No. 2004-177575 discloses a display device for controlling a frame frequency conversion rate of a liquid crystal display panel in accordance with internal temperature of the device.

Further, as another method of reducing the motion blur, for example, Japanese Patent Application Laid-open No. 2000-321551 discloses a technology in which a plurality of direct type backlights are arranged on a rear surface of a liquid crystal display panel in a direction parallel to scanning lines and are sequentially flashed in synchronization with scanning signals so that display characteristics of the display device may be obtained similar to those of the impulse type (hereinafter, referred to as scanning type intermittent lighting drive).

Further, Japanese Patent Application Laid-open No. 2004-45748 discloses displaying a part of a screen in a liquid crystal display device and not displaying the other area of the screen mainly for reducing power consumption associated with the displaying (partial drive).

SUMMARY OF THE INVENTION

In the technology described in Japanese Patent Application Laid-open No. 2004-177575, one-frame images stored in a frame memory are read in a predetermined cycle to create sub-frame images based on the read images and motion vectors, and the created images are interpolated before a next input image signal, so as to display image at a frame frequency higher than an original frame frequency. Accordingly, Japanese Patent Application Laid-open No. 2004-177575 is completely silent with respect to a factor of image quality degradation occurring in switching the frame frequency, such as frame drops and flicker.

Similarly, Japanese Patent Application Laid-open No. Hei 04-302289, Japanese Patent Application Laid-open No. 2000-321551, and Japanese Patent Application Laid-open No. 2004-45748 do not disclose at all a factor of image quality degradation occurring in switching the frame frequency, such as frame drops and flicker.

The present invention has been made in view of the above-mentioned problems, and it is one of objects of the present invention to provide a display device preventing image quality degradation, such as frame drops and flicker, when switching a frame frequency of a display image.

In view of the above-mentioned problems, in one aspect of the present invention, a display device displays an image corresponding to input display data that is inputted from an external device. The display device includes a display panel including a plurality of pixels arrayed therein, a first drive circuit configured to output a display signal corresponding to the input display data to each of the plurality of pixels, a second drive circuit configured to output a selection signal to each of the plurality of pixels. The selection signal selects the plurality of pixels supplied with the display signal. The display device also includes a frame frequency conversion circuit configured to convert a frame frequency of the input display data according to a mode switch signal; and a timing control circuit configured to control the first drive circuit and the second drive circuit based on a frame frequency after the conversion. The display device generates at least two display areas on the display panel according to the mode switch signal. The at least two display areas displays images at different frame frequencies. The display device further includes a switch unit configured to display an image at the frame frequency before the conversion at one of the at least two display areas and configured to display an image at the frame frequency after the conversion at another one of the at least two display areas. At least one of a boundary position and a size of the at least two display areas varies with time.

In another aspects of the present invention, a display device includes a display panel including a plurality of pixels arrayed therein, a first drive circuit configured to output a display signal corresponding to input display data to each of the plurality of pixels, a second drive circuit configured to output a selection signal to each of the plurality of pixels. The selection signal selects the plurality of pixels supplied with the display signal. The display device also includes a frame frequency conversion circuit configured to convert a frame frequency of the input display data for displaying and a timing control circuit configured to control the first drive circuit and the second drive circuit. An image is displayed by at least two display modes. The at least two display modes include a first display mode displaying at a first frame frequency and a second display mode displaying at a second frame frequency. The first frame frequency is different from the second frame frequency. The first display mode and the second display mode have different lengths of selection periods in which the selection signal output from the second drive circuit selects the plurality of pixels. The at least two display modes further includes a third display mode that is provided in a course of switching between the first display mode and the second display mode. The third display mode has a selection period that is equal to or shorter than the selection period in the first display mode, and equal to or longer than the selection period in the second display mode. The selection period in the third display mode varies with time in at least two steps.

According to one or more embodiments of the present invention, image quality degradation, such as frame drops and flicker, can be prevented when switching the frame frequency of the display image.

Other effects of the present invention become clear from the entire description of the specification.

DETAILED DESCRIPTION OF THE INVENTION

Figure 1:
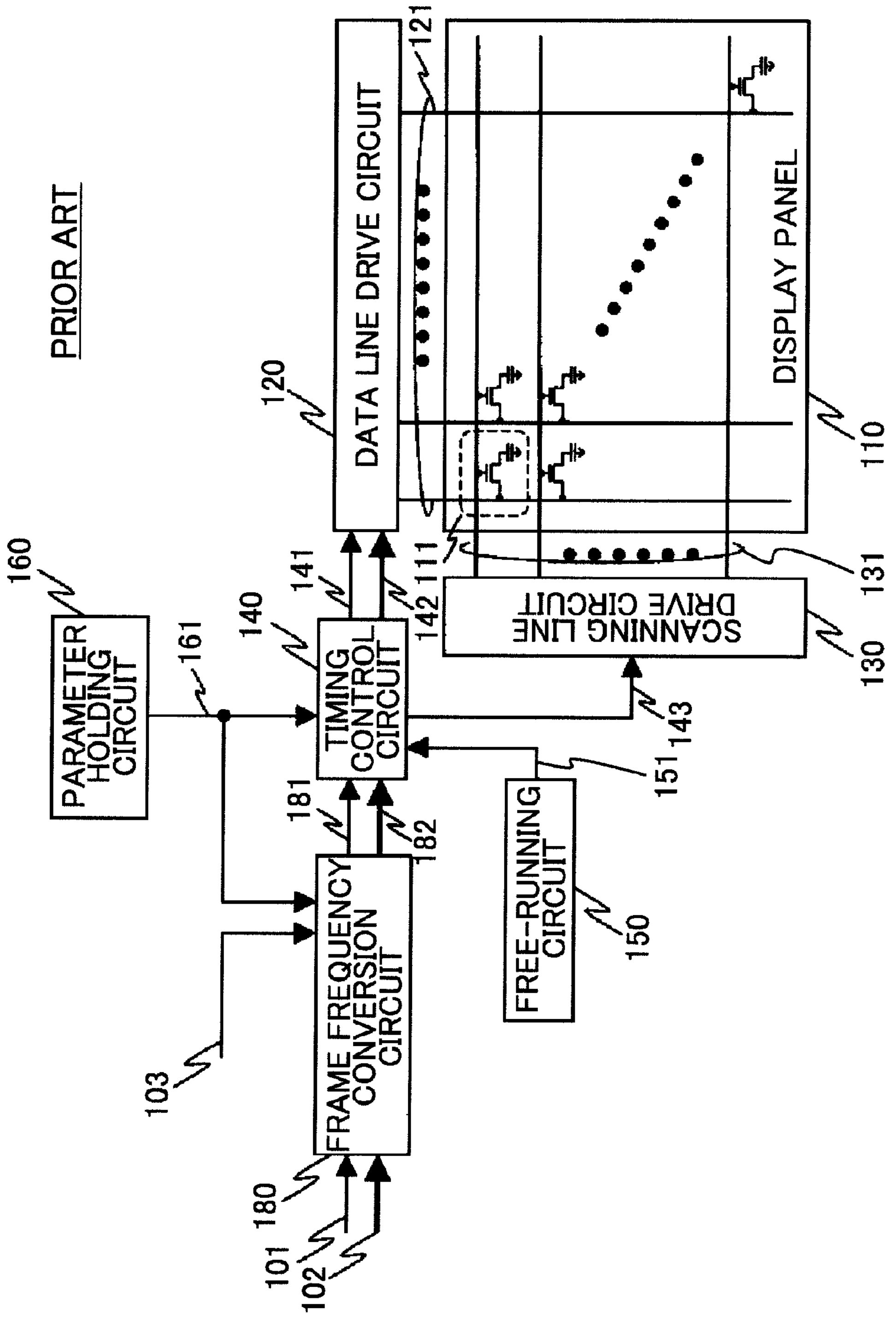
FIG. 1 is a diagram illustrating a schematic configuration of a conventional display device.

Hereinafter, embodiments to which the present invention is applied are described with reference to the accompanying drawings. It should be noted that, in the following description, the same components are denoted by the same reference numerals so that repetitive description thereof is omitted.

First Embodiment

Overall Configuration

Figure 6:
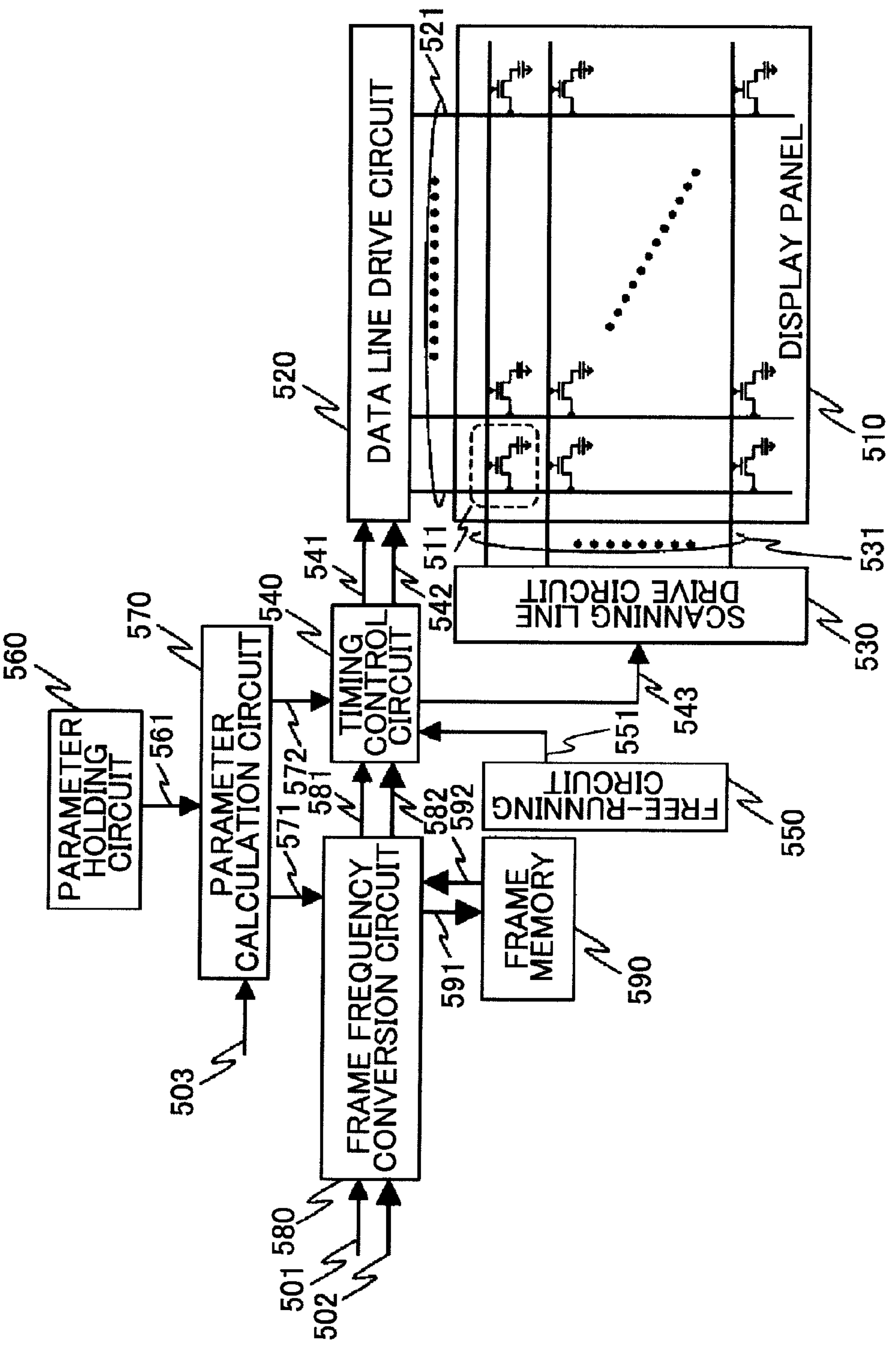
FIG. 6 is a diagram illustrating a schematic configuration of the display device according to the first embodiment of the present invention.

FIG. 6 is a diagram illustrating a schematic configuration of a display device according to a first embodiment of the present invention. Referring to FIG. 6, an overall configuration of the display device according to the first embodiment is described below. It should be noted that the description is directed to a case where the present invention is applied to a liquid crystal display panel as a display panel illustrated in FIG. 6. Other display panels are applicable as long as a corresponding display device includes a scanning line drive circuit and a data line drive circuit, such as an organic electroluminescence (EL) panel, a liquid crystal on silicon (LCOS) display, a plasma display panel, a field emission display, and electronic paper.

The display device according to the first embodiment illustrated in FIG. 6 is provided with at least two display modes using different frame frequencies, for example, 60 Hz and 120 Hz, and is provided with a function of switching the display mode. In order to switch the frame frequency, the display device according to the first embodiment includes a frame frequency conversion circuit 580, a frame memory 590, a timing control circuit 540, a free-running circuit 550, a parameter holding circuit 560, a parameter calculation circuit 570, a data line drive circuit (drain line drive circuit) 520, a scanning line drive circuit (gate line drive circuit) 530, and a display panel 510.

In the display device according to the first embodiment, input display data 502 and an input control signal group 501 are input from an external device or the like to the frame frequency conversion circuit 580, and a display mode switch signal 503 is input therefrom to the parameter calculation circuit 570. Based on a control parameter 561 from the parameter holding circuit 560, the parameter calculation circuit 570 outputs a control parameter 571 to be used for frame frequency conversion to the frame frequency conversion circuit 580, and outputs a control parameter 572 to be used for display timing control to the timing control circuit 540. The frame frequency conversion circuit 580 supplies the input display data 502 to the frame memory 590 if necessary. Further, the frame frequency conversion circuit 580 performs frame frequency conversion processing on the input display data 502 and the input control signal group 501, and outputs the resultant outputs (frame-frequency-converted display data 582 and frame-frequency-converted control signal group 581) to the timing control circuit 540. Based on the frame-frequency-converted control signal group 581 and the frame-frequency-converted display data 582 supplied from the frame frequency conversion circuit 580, the control parameter 572 supplied from the parameter calculation circuit 570, and a free-running control signal group 551 supplied from the free-running circuit 550, the timing control circuit 540 generates a data line drive circuit control signal group 541 and output display data 542 to control the data line drive circuit 520. The timing control circuit 540 further generates a scanning line drive circuit control signal group 543 to control the scanning line drive circuit 530.

Referring to FIG. 6, specific description is given below. In the display device according to the first embodiment, the input control signal group 501 contains, for example, a vertical synchronization signal that defines one frame period (display period for one screen), a horizontal synchronization signal that defines one horizontal scanning period (display period for one line), a data effective period signal that defines an effective period of display data, and a reference clock signal that is synchronized with the display data.

The input display data 502, the input control signal group 501, and the display mode switch signal 503 are input from an external signal generation circuit (external device) (not shown) to the display device according to the first embodiment. The external device is, for example, an image signal processing device connected to the display device according to the first embodiment, and generates the display mode switch signal 503, which is a signal for switching the display mode in accordance with a temperature change inside/outside the display device or characteristics of the input display data, or in response to a user's instruction. The display mode switch signal 503 is a signal that instructs the switching of the display mode in the display device according to the present invention.

The frame frequency conversion circuit 580 is a circuit for converting a frame frequency (first frame frequency) of the input display data 502 into a second frame frequency, to thereby generate the frame-frequency-converted display data 582. Hereinafter, a display mode that operates at the first frame frequency (for example, 60 Hz) is referred to as a first display mode, a display mode that operates at the second frame frequency (for example, 120 Hz) is referred to as a second display mode, and a display mode in which one screen is constituted by mixing a first display area driven at the first frame frequency and a second display area driven at the second frame frequency is referred to as a third display mode. The frame frequency conversion circuit 580 further generates the frame-frequency-converted control signal group 581. The frame-frequency-converted control signal group 581 contains, for example, a vertical synchronization signal that defines one frame period of the frame-frequency-converted display data 582, a horizontal synchronization signal that defines one horizontal scanning period, a display data effective period signal that defines an effective period of the frame-frequency-converted display data 582, and a clock signal that is synchronized with the frame-frequency-converted display data 582.

The timing control circuit 540 receives as inputs the frame-frequency-converted control signal group 581 and the frame-frequency-converted display data 582, which are output from the frame frequency conversion circuit 580, and the control parameter 572 which is output from the parameter calculation circuit 570. Then, based on the frame-frequency-converted control signal group 581, the frame-frequency-converted display data 582, and the control parameter 572, the timing control circuit 540 generates the data line drive circuit control signal group 541 for controlling the data line drive circuit 520, the output display data 542, and the scanning line drive circuit control signal group 543 for controlling the scanning line drive circuit 530.

The parameter holding circuit 560 holds the control parameter 561 to be used in the frame frequency conversion circuit 580 and the timing control circuit 540. The parameter holding circuit 560 is constituted by various types of non-volatile memory, such as a read-only memory (ROM) and an electrically erasable programmable ROM (EEPROM) flash memory. The control parameter 561 is control information for controlling the display panel 510 and includes, for example, a vertical synchronization signal frequency (equivalent to frame frequency), a horizontal synchronization signal frequency, a clock frequency, and a vertical resolution and a horizontal resolution of the display panel 510, which are used for generating the frame-frequency-converted control signal group 581 and the like.

Based on the display mode switch signal 503, the parameter calculation circuit 570 refers to the control information held by the parameter holding circuit 560 to generate the control parameter 571 for the frame frequency conversion circuit 580 and the control parameter 572 for the timing control circuit 540. The control parameters 571 and 572, which are computed by the parameter calculation circuit 570 according to the first embodiment, include the vertical synchronization signal frequency (equivalent to frame frequency), the horizontal synchronization signal frequency, the clock frequency, the vertical resolution and the horizontal resolution of the display device, the respective positions and sizes of the first display area and the second display area, a standby period N, a length of a scanning line selection period, a write address and a read address of the frame memory 590, and the like, which are used for generating the frame-frequency-converted control signal group 581, the data line drive circuit control signal group 541, the output display data 542, the scanning line drive circuit control signal group 543, and the like. The standby period N and the length of the scanning line selection period are described in detail later.

The free-running circuit 550 generates the free-running control signal group 551. The free-running control signal group 551 is a signal to be used for controlling the display panel 510 instead of the frame-frequency-converted control signal group 581 if the normal and stable frame-frequency-converted control signal group 581 (and frame-frequency-converted display data 582) cannot be supplied to the timing control circuit 540. A display mode of controlling the display panel 510 by means of the free-running control signal group 551 is referred to as a free-running mode. The free-running mode is a display mode provided mainly for protecting the display panel 510 and preventing noise display. For example, if the timing control circuit 540 operates based on an abnormal and unstable frame-frequency-converted control signal group 581, the data line drive circuit 520 and the scanning line drive circuit 530 may malfunction to cause an adverse effect on those circuits and the display panel 510, such as a failure. The free-running mode prevents such a malfunction.

In order to switch between the free-running mode and the normal display modes, the timing control circuit 540 according to the first embodiment is provided with a function of detecting an abnormality in the frame-frequency-converted control signal group 581. The abnormality in the frame-frequency-converted control signal group 581 includes a lack of various input signals (vertical synchronization signal, horizontal synchronization signal, data effective period signal, clock signal, etc), a too-high frequency, a too-low frequency, and the like. In the free-running mode, for example, a black screen is displayed on the display panel 510 to prevent displaying noise.

The data line drive circuit control signal group 541 contains, for example, an output timing signal that defines an output timing of a gray scale voltage based on the output display data 542, an alternating current signal that determines a polarity of a data voltage based thereon, and a clock signal that is synchronized with the output display data 542.

The scanning line drive circuit control signal group 543 contains, for example, a shift signal that defines a scanning line selection period for one line and a vertical start signal that defines a scanning start of the first line.

The data line drive circuit 520 generates potentials in correspondence with the number of gray scales for displaying, and selects a one-level potential in correspondence with the output display data 542 and applies the potential to the liquid crystal display panel 510 as a data voltage (gray scale voltage, drain signal) 521.

The scanning line drive circuit 530 generates scanning line selection signals (gate signals) 531 based on the scanning line drive circuit control signal group 543, and outputs the scanning line selection signals 531 to scanning lines of the display panel 510. Here, the scanning line drive circuit 530 according to the first embodiment is capable of outputting the scanning line selection signals 531 at different frames only to scanning lines designated by the scanning line drive circuit control signal group 543. In other words, the scanning line drive circuit 530 is capable of arbitrarily setting to which of the scanning lines the scanning line selection signals 531 are output at the first frame frequency and to which of the scanning lines the scanning line selection signals 531 are output at the second frame frequency, in accordance with the scanning line drive circuit control signal group 543.

As described above, the display panel 510 is a well-known liquid crystal display panel, in which pixels 511 are arranged in matrix that are defined by horizontally-extending scanning lines arranged in parallel in the vertical direction of FIG. 6 and vertically-extending data lines arranged in parallel in the horizontal direction of FIG. 6. Each of the pixels 511 of the liquid crystal display panel 510 includes a thin film transistor (TFT), which is formed of a source electrode, a gate electrode, and a drain electrode, a pixel electrode connected to the source electrode of the TFT, a counter electrode (common electrode) disposed opposite to the pixel electrode, and a liquid crystal layer that is controlled in transmittance by an electric field applied between the pixel electrode and the counter electrode. In the liquid crystal display panel with such a structure, the TFT performs a switch operation when the gate electrode is applied with a scanning signal. While the TFT is in a closed state, a voltage of the data line connected to the drain electrode is written into the pixel electrode connected to the source electrode. On the other hand, while the TFT is in an open state, the voltage written into the pixel electrode is maintained. In this case, when the voltage of the pixel electrode and the voltage of the counter electrode are represented by Vd and VCOM, respectively, the liquid crystal layer changes a polarization direction based on a potential difference between the pixel electrode voltage Vd and the counter electrode voltage VCOM. Then, by using polarizers disposed on the upper and lower sides of the liquid crystal layer, the amount of transmitted light from a backlight disposed on a rear side varies so as to display based on gray scale.

[Display Mode Switch Operation]

Figure 7:
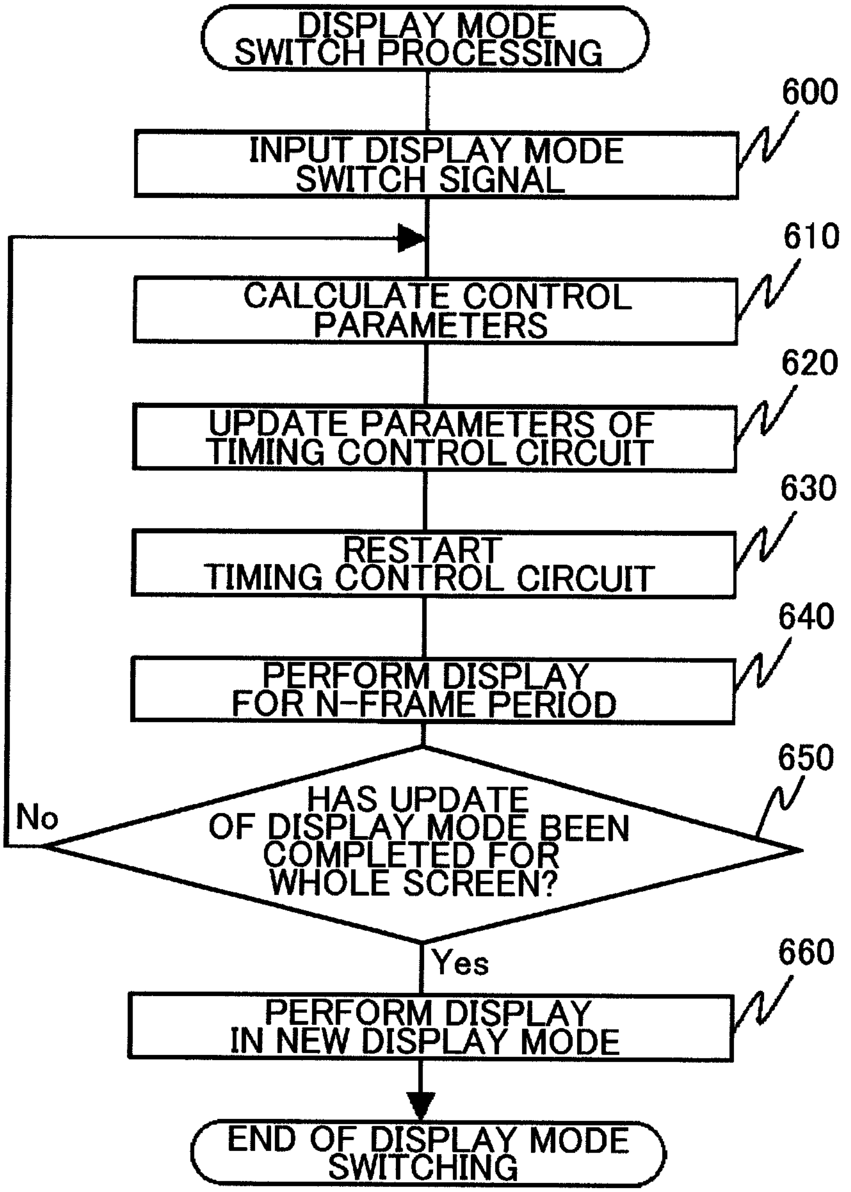
FIG. 7 is a flow chart illustrating an exemplary operation procedure of display mode switch processing performed in the display device according to the first embodiment of the present invention.
Figure 8:
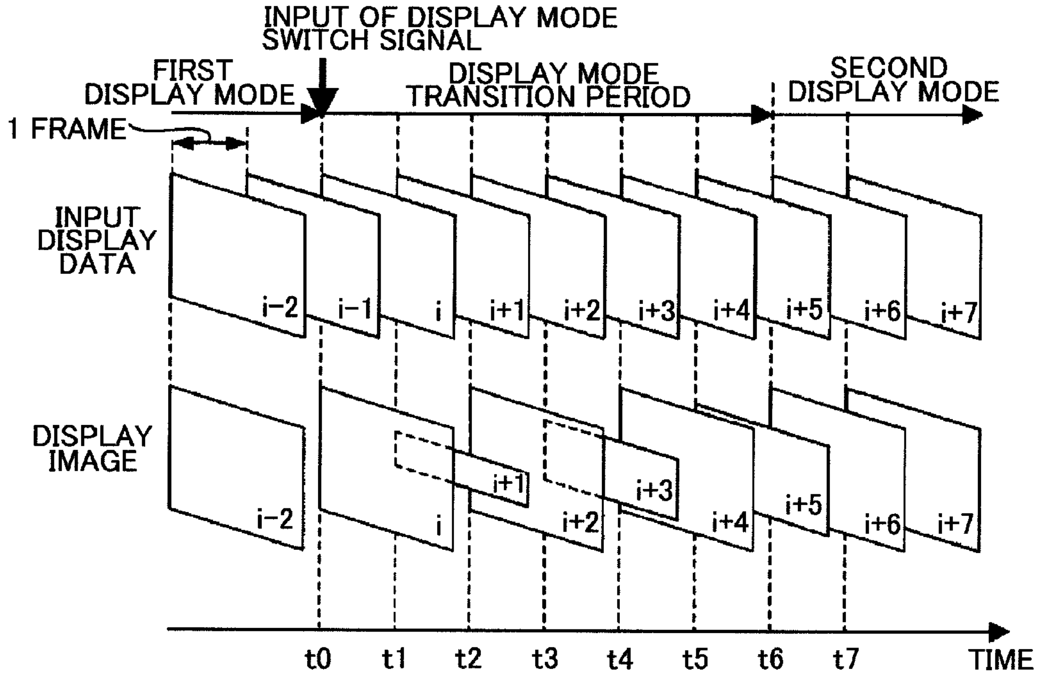
FIG. 8 is a conceptual diagram illustrating how a display mode switch operation is performed in the display device according to the first embodiment of the present invention.

FIG. 7 is a flow chart illustrating an exemplary operation procedure of display mode switch (frame frequency switch) processing performed in the display device according to the first embodiment of the present invention. FIG. 8 is a conceptual diagram illustrating how the display mode switch operation is performed in the display device according to the first embodiment of the present invention. Referring to FIG. 7 and FIG. 8, the display mode switch operation performed in the display device according to the first embodiment illustrated in FIG. 6 is described below. It should be noted that, unlike an operation of a conventional display device described later, with regard to the operation performed in the display device according to the first embodiment, the display mode switching does not involve switching the operation to the free-running mode, and further, based on the control parameters 571 and 572 from the parameter calculation circuit 570, the control parameters of the timing control circuit 540 and the frame frequency conversion circuit 580 are read and updated a plurality of times. Therefore, in the following, respective operations of the parameter calculation circuit 570, the timing control circuit 540, and the frame frequency conversion circuit 580, which are different from the operation of the conventional display device, are described. FIG. 8 is a diagram obtained by plotting how display images of the display device correspond to input display data with time, representing time along the horizontal axis. FIG. 8 illustrates the particular case where the frame frequency of the first display mode is lower than the frame frequency of the second display mode.

The flow starts when the display mode switch signal 503 is input. Upon inputting the display mode switch signal 503 at a time t0 illustrated in FIG. 8, the parameter calculation circuit 570 receives the input of the display mode switch signal 503 (Step 600), and the parameter calculation circuit 570 recalculates the control parameters 571 and 572 (Step 610). It should be noted that, while the control parameters 571 and 572 adapted to a new display mode are calculated, the control parameters 571 and 572 adapted to a previous display mode are output to the frame frequency conversion circuit 580 and the timing control circuit 540, respectively. As described above, the display device according to the first embodiment changes the display mode to a display mode designated by the display mode switch signal 503 via the third display mode, and only a partial area of a whole screen is changed in frame frequency. Therefore, the computation amount in Step 610 is so small as to end the calculation in one frame period.

When the calculation of the control parameters 571 and 572 is completed, the parameter calculation circuit 570 outputs the calculated control parameter 571 to the frame frequency conversion circuit 580, and outputs the calculated control parameter 572 to the timing control circuit 540.

In the frame frequency conversion circuit 580 and the timing control circuit 540 supplied with the calculated control parameters 571 and 572, internal parameters are updated based on the supplied control parameters 571 and 572, respectively (Step 620).

Subsequently, the frame frequency conversion circuit 580 and the timing control circuit 540 are restarted. Then, the frame frequency conversion circuit 580 outputs the updated frame-frequency-converted control signal group 581 and the updated frame-frequency-converted display data 582 to the timing control circuit 540. Further, the timing control circuit 540 outputs the updated data line drive circuit control signal group 541 and the updated output display data 542 to the data line drive circuit 520, and outputs the updated scanning line drive circuit control signal group 543 to the scanning line drive circuit 530 (Step 630). Based on the outputs in Step 630, an image is displayed in the third display mode.

Subsequently, until a preset N-frame period (N is a natural number) elapses, the display operation is performed based on the updated control parameters, that is, the display operation is performed with the control parameters remain unchanged (Step 640). The standby for the N frames in Step 640 is taken for preventing the image quality from degrading due to the abrupt change of the display mode. As N takes a smaller value, the display mode is changed more quickly. As N takes a larger value, the display mode is changed more slowly. It is preferable to adjust the value of N in advance to an appropriate value so as to prevent the image quality degradation, but N may be variable.

In subsequent Step 650, it is determined whether or not the update of the display mode has been completed for a whole screen. When the update is not completed, the process returns to Step 610 where the parameter calculation circuit 570 recalculates the control parameters 571 and 572, to thereby expand the area adapted to the new display mode. This operation is repeated until the display mode is updated for the whole screen.

On the other hand, when it is determined in Step 650 that the update of the display mode has been completed for the whole screen, the display is performed in the new display mode instructed by the display mode switch signal 503 (Step 660).

It should be noted that, in a case of steadily displaying the first display area and the second display area with N set to a large value, image quality degradation, such as streaks, is perceived at a boundary between the first display area and the second display area because the first display area and the second display area are driven with different methods, that is, at different frame frequencies. In order to avoid such image quality degradation, it is preferable that the boundary position between the first display area and the second display area as well as the size of the second display area be varied with time rather than be fixed all the time. Taking measures, such as scrolling of the position of the second display area and vibrating the boundary between the display areas, prevents the above-mentioned image quality degradation, such as streaks, from being perceived at the boundary. The measures are realized by the parameter calculation circuit 570 recalculating the control parameters 571 and 572 sequentially so that the control parameters 571 and 572 can vary with time.

[Description of Display Operation]

Figure 4:
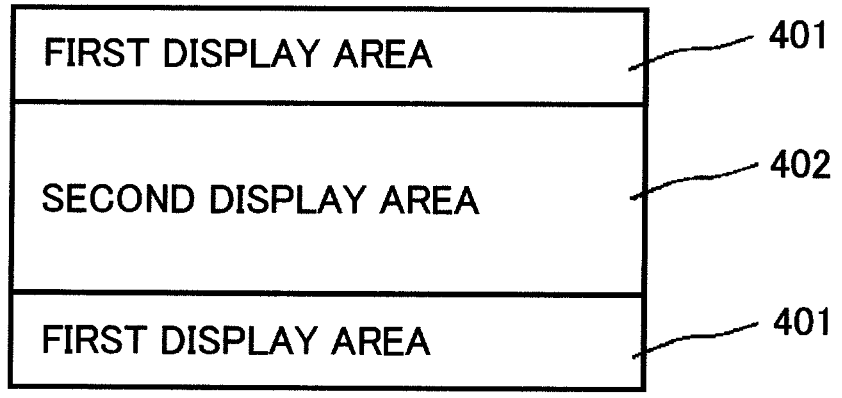
FIG. 4 is a diagram for illustrating an exemplary display operation during display mode switching performed in a display device according to a first embodiment of the present invention.
Figure 5:
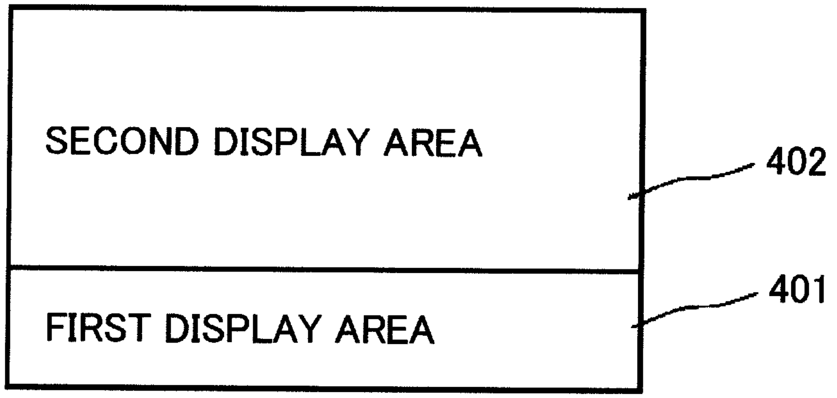
FIG. 5 is a diagram for illustrating an exemplary display operation during the display mode switching performed in the display device according to the first embodiment of the present invention.

FIG. 4 and FIG. 5 are diagrams for illustrating exemplary display operations during the display mode switching performed in the display device according to the first embodiment of the present invention. Referring to FIG. 4 and FIG. 5, the display operations during the display mode switching performed in the display device according to the first embodiment illustrated in FIG. 6 are described below. It should be noted that FIG. 4 and FIG. 5 are exemplary diagrams for illustrating the display operations during the display mode switching.

As illustrated in FIG. 4, in the course of shift from the first display mode that operates at the first frame frequency to the second display mode that operates at the second frame frequency, the display device according to the first embodiment changes a frame frequency from the first frame frequency to the second frame frequency for each preset region within the display screen of the display panel 510 so that the frame frequencies of all the regions within the display screen (whole display screen) may eventually be changed to the second frame frequency. In other words, by reducing a time period that is required for the control parameters 571 and 572 to be computed for abruptly changing the frame frequencies within the whole display screen and that is a cause for frame drops when switching the display mode, the frame frequency can be switched without displaying in black on the whole display screen by means of the free-running mode.

Specifically, in the course of the shift where the first display mode is switched to the second display mode, the third display mode is provided as illustrated in FIG. 4, in which the display screen is constituted by first display areas 401 driven in the first display mode and a second display area 402 driven in the second display mode. Further, in the third display mode, the size of the second display area 402 is gradually increased with time in the screen vertical direction, for example, starting from zero in a central area (zero area) in the screen vertical direction, so that the second display area 402 may constitute the whole screen eventually. In contrast, in the case where the second display mode is switched to the first display mode, in the third display mode, the size of the first display area 401 is gradually increased with time, starting from zero, so that the first display area 401 may constitute the whole screen eventually. This procedure prevents frame drops and enables smooth shift of the display mode. Further, in the case where the second display mode is switched to the first display mode, it is preferable to replace the respective positions of the first display area 401 and the second display area 402, which are exemplarily described above with reference to FIG. 4 and FIG. 5.

It should be noted that the second display area 402 is positioned in the vertical center of the screen in FIG. 4, but the position of the second display area 402 is not limited thereto. For example, as illustrated in FIG. 5, the second display area 402 may be formed from the upper side of the screen so that the first display area 401 on the lower side may be sequentially replaced with the second display area 402 downward. Alternatively, other dividing methods may be employed. Further, the screen may be divided into a large number of display areas if necessary, rather than into two display areas. Still further, so-called hysteresis may be provided so that the respective positions and sizes as well as the change rates of the display areas may be made different between the case where the first display mode is switched to the second display mode and the reverse case where the second display mode is switched to the first display mode.

It should be noted that, as illustrated in FIG. 4, if the display mode is shifted so that an area with the shifted display mode may expand from the central portion of the screen in the vertical direction, motion blur at the screen center at which a human gazes can be improved with priority. On the other hand, as illustrated in FIG. 5, if the display mode is shifted so that an area with the shifted display mode may expand from the upper side of the screen in the vertical direction, the existing control method for the scanning line drive circuit can be used with a little modification. The reason is as follows.

For example, as illustrated in FIG. 4, if the second display area 402 is provided only at the center of the screen, the scanning line drive circuit needs to be controlled so that scanning line selection signals may be effective only at the center of the screen. Here, the scanning line drive circuit 530 may be constituted by a well-known shift register for simplicity, which is commonly used. Accordingly, in order to select the scanning lines of the second display area 402 without selecting the scanning lines of the first display area 401 on the upper side of the screen, it is necessary to control the shift register so as to output null shift signals (with no data voltage applied thereto). In contrast, as illustrated in FIG. 5, if the scanning lines are selected from the upper side of the screen, special control such as outputting null shift signals is unnecessary.

Next, referring to the conceptual diagram of FIG. 8 illustrating how the display mode switch operation is performed in the display device according to the first embodiment of the present invention, the display mode switch operation performed in the display device according to the first embodiment is described below. FIG. 8 is a diagram obtained by plotting how display images of the display device correspond to input display data with time, representing time along the horizontal axis. FIG. 8 illustrates the particular case where the frame frequency of the first display mode is lower than the frame frequency of the second display mode.

The following description is directed to a case where the frame frequency of the first display mode is ½ of the frame frequency of the second display mode. It should be noted that the description is given as to the display mode switch operation illustrated in FIG. 8 where the input display data is input to the frame frequency conversion circuit 580 at the same frame frequency as in the second display mode. Further, in the following description, only even-numbered frames of the input display data are displayed in the first display mode while all the frames of the input display data are displayed in the second display mode, to thereby convert the frame frequency of the second display mode to ½ thereof for the frame frequency of the first display mode for display.

Regarding the input display data, an i-2 frame, an i-1 frame, . . . are input sequentially. Here, at the time t0, that is, upon the input of the i frame, the switching of the display mode (that is, the switching of the frame frequency) is instructed by the display mode switch signal. In this case, as described above with reference to FIG. 7, the parameter calculation circuit recalculates the control parameters so that at a time t1 when the input display data of the subsequent i+1 frame is displayed as a display image, only pieces of the input display data of the i+1 frame corresponding to a part of a central portion of one screen are displayed as a display image. In other words, the control parameters are updated so that a part of the input display data of the i+1 frame is displayed as the second display area.

At a time t2 when the input display data of the subsequent i+2 frame is displayed as a display image, all pieces of the input display data of the i+2 frame corresponding to one screen are displayed as an image.

At a time t3 when the input display data of the i+3 frame is displayed as a display image, only pieces of the input display data of the i+3 frame corresponding to a partial region of the central portion of one screen are displayed as an image of the second display area. The partial region is larger in size than the part of the central portion at the time t1.

At a time t4 when the input display data of the i+4 frame is displayed as a display image, all pieces of the input display data of the i+4 frame corresponding to one screen are displayed as an image.

At a time t5 when the input display data of the i+5 frame is displayed as a display image, only pieces of the input display data of the i+5 frame corresponding to a partial region of the central portion of one screen are displayed as an image of the second display area. The partial region is larger in size than the partial region at the time t3.

At a time t6 when the input display data of the i+6 frame is displayed as a display image, all pieces of the input display data of the i+6 frame corresponding to one screen are displayed as an image.

At a time t7 when the input display data of the subsequent i+7 frame is displayed as a display image, all pieces of the input display data of the i+7 frame corresponding to one screen are displayed as an image of the second display area. In other words, after the time t7, the second display mode is performed to sequentially display all pieces of the input display data in a one-frame cycle.

As described above, after the input of the display mode switch signal, the display device according to the first embodiment performs the third display mode to gradually increase the second display area using the i+1 frame, the i+3 frame, and the i+5 frame, and, then, when using the i+7 frame, an image is displayed by the second display mode that displays the whole screen in the second display area. Thus, the display mode switch operation is completed.

According to the display device of the first embodiment of the present invention, the control parameters used for switching the display mode are changed by the calculation in the parameter calculation circuit, rather than reading from the parameter holding circuit. As a result, the control parameters can be updated in a shorter period of time, and hence the display mode can be changed without frame drops.

It should be noted that the frame frequencies and the switch order of the frame frequencies are exemplary ones taken for the description, and other combinations may be selected. Further, FIG. 8 exemplifies the frame frequency conversion where the frame frequency is changed by omitting the display of the even-numbered frames. However, there may be employed frame frequency conversion where sub-frames are newly created by means of interpolation computation and the created sub-frames are interpolated between the input display data. Still further, no limitation is placed on the combination of the input display data frame frequency, the first frame frequency, and the second frame frequency, and an arbitrary combination may be made.

However, for the purpose of reducing motion blur, it is preferable to set at least one of the first frame frequency and the second frame frequency to be higher than the input display data frame frequency. On the other hand, for the purpose of reducing power consumption, it is preferable to set at least one of the first frame frequency and the second frame frequency to be lower than the input display data frame frequency.

[Detailed Description of Display Mode Switch Control]

Figure 9:
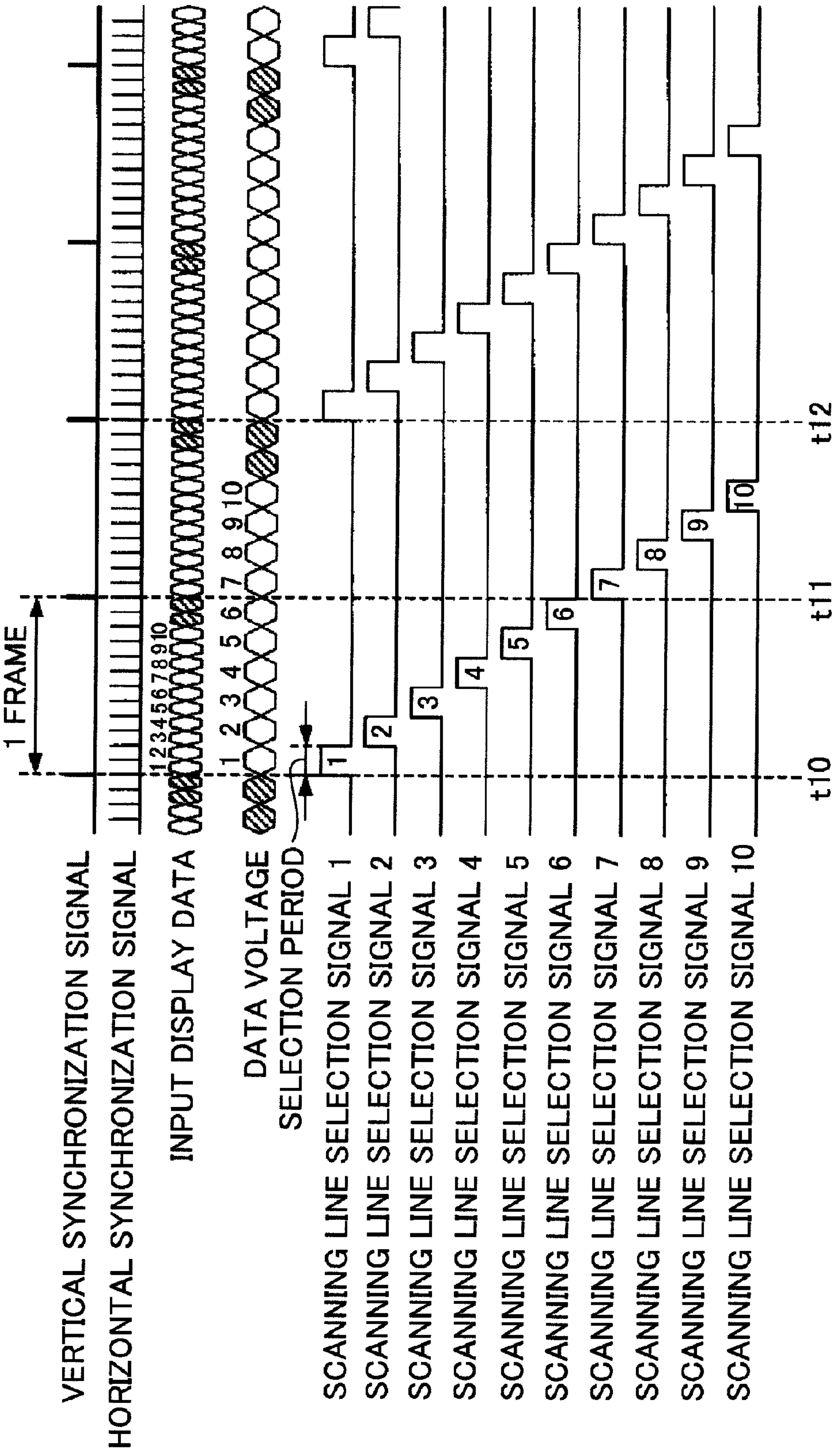
FIG. 9 is a timing chart illustrating an exemplary operation of a first display mode performed in the display device according to the first embodiment of the present invention.
Figure 10:
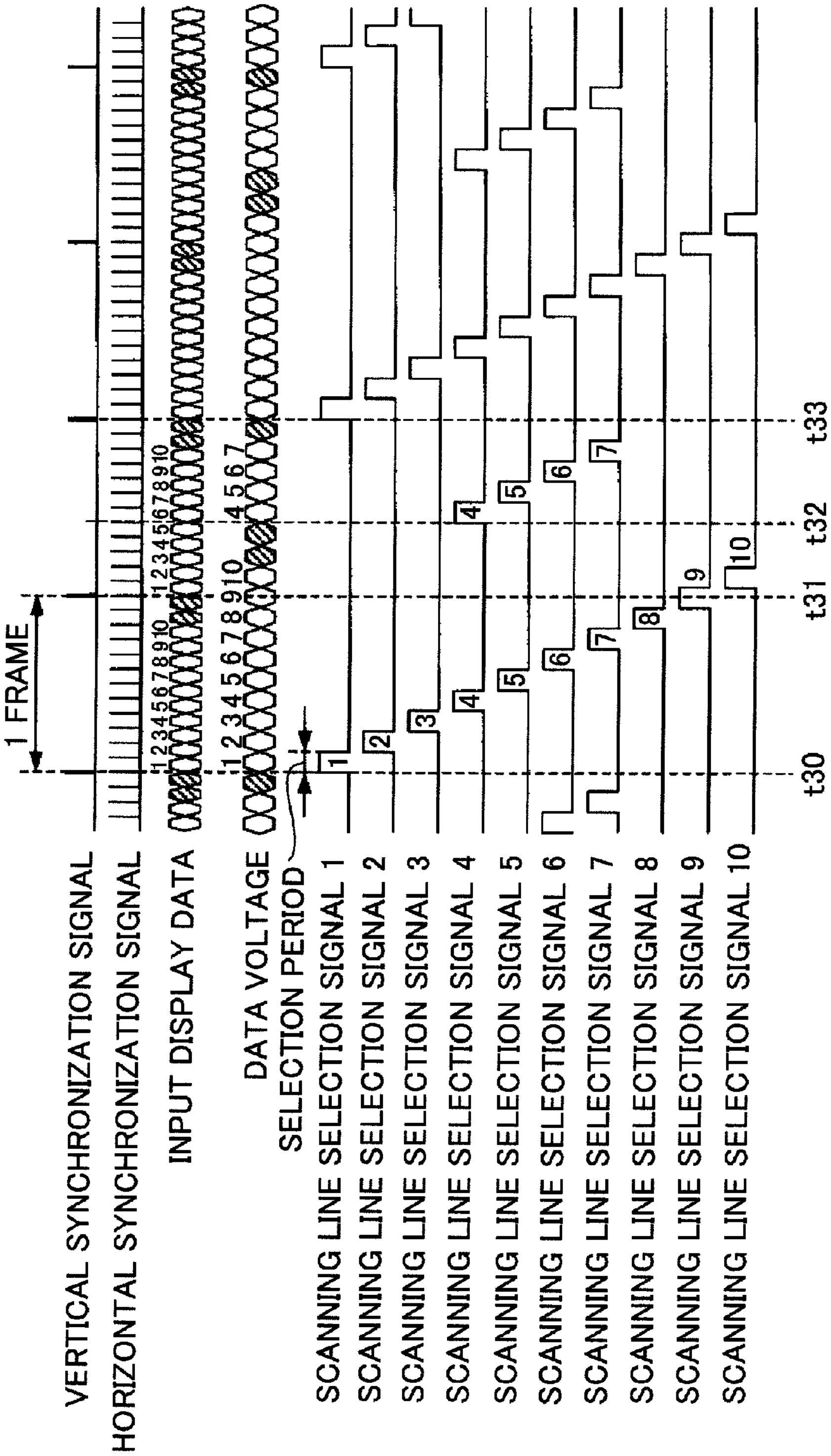
FIG. 10 is a timing chart illustrating an exemplary operation during a transition period serving as a third display mode performed in the display device according to the first embodiment of the present invention.
Figure 11:
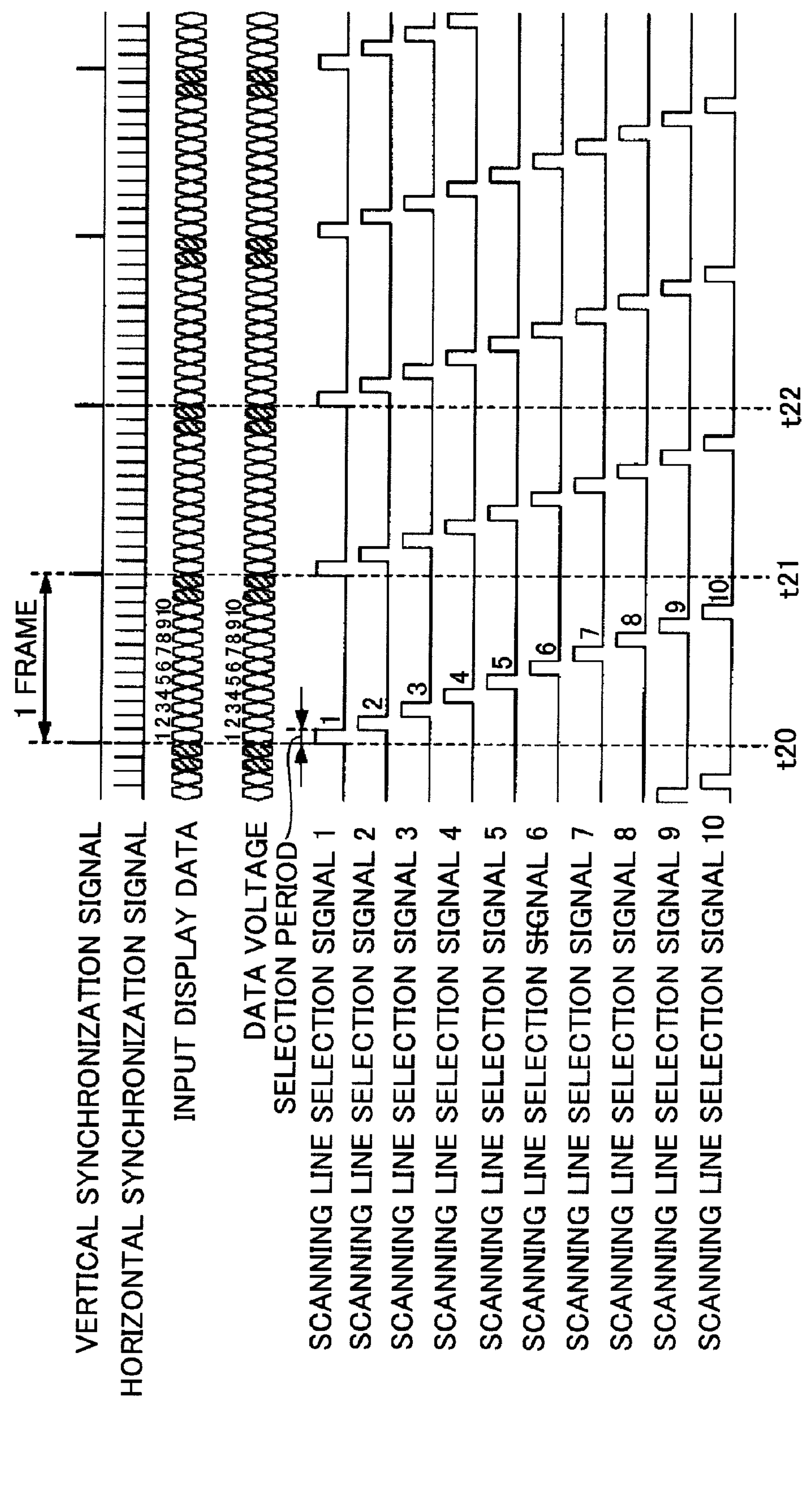
FIG. 11 is a timing chart illustrating an exemplary operation of a second display mode performed in the display device according to the first embodiment of the present invention.

FIG. 9 is a timing chart illustrating an exemplary operation of the first display mode performed in the display device according to the first embodiment of the present invention. FIG. 10 is a timing chart illustrating an exemplary operation during a transition period serving as the third display mode performed in the display device according to the first embodiment of the present invention. FIG. 11 is a timing chart illustrating an exemplary operation of the second display mode performed in the display device according to the first embodiment of the present invention. Referring to FIGS. 9 to 11, the operation during the display mode switching performed in the display device according to the first embodiment is described in detail below. It should be noted that, for simplicity of the description, the following description is directed to a case where the number of scanning lines is 10 (that is, the resolution in the vertical direction is 10 lines and the number of scanning line selection signals is also 10), but the number of scanning lines is not limited to 10. A display device generally includes several hundreds to several thousands of scanning lines. Further, the scanning line selection signal has at least two states, a selected state (at high level) and a non-selected state (at low level). In updating a predetermined line for display, the scanning line selection signal selects the scanning line of the corresponding line, and during the selection period of the scanning line, a data voltage corresponding to input display data of the scanning line is applied so that the input display data may be held by a corresponding pixel.

FIGS. 9 to 11 each illustrate a relationship regarding the display mode switching illustrated in FIG. 8 among the input control signal group (vertical synchronization signal and horizontal synchronization signal), the input display data, the data voltage output from the data line drive circuit, and the scanning line selection signals output from the scanning line drive circuit. FIG. 9 corresponding to the first display mode illustrates a case where only even-numbered frames of the input display data are displayed (that is, the frame frequency is converted to ½ for display in the first display mode). FIG. 10 corresponding to the third display mode illustrates a case where lines 4 to 7 serve as the second display area while the other lines serve as the first display area in the course of the switching from the first display mode to the second display mode. FIG. 11 corresponding to the second display mode illustrates a case where the input display data is displayed as it is (that is, the frame frequency conversion is not performed in the second display mode).

As is apparent from FIG. 9, in the first display mode, the input display data that is input between times t10 and t11, which corresponds to an even-numbered frame in the case of the frame frequency of 120 Hz, is displayed during a period between the times t10 and t12, the period being equivalent to a frame period corresponding to the frame frequency of the first display mode (½ of the frame frequency of the input display data).

In other words, because the resolution in the vertical direction is 10 lines, input display data pieces 1 to 10 corresponding to the input display data for 10 lines are input in synchronization with the horizontal synchronization signal during the period between the times t10 and t11, which is a one-frame period. It should be noted that the hatched lines are vertical blanking periods where no input display data is input. The input display data is temporarily stored in the frame memory, and then read out sequentially.

The frame frequency of the display panel is converted to ½ thereof by the operation of the frame frequency conversion circuit. Accordingly, as to the input display data pieces 1 to 10 for 10 lines, signals for 10 lines are output to the display panel by means of the scanning line selection signals and the data voltages during a two-frame period, that is, between the times t10 and t12. In the first embodiment, a selection period in which one scanning line selection signal is selected is longer than one cycle of the horizontal synchronization signal.

In other words, as image display corresponding to the input display data that is input during the even-numbered frame period between the times t10 and t11, in the first display mode, the data voltages corresponding to the input display data pieces 1 to 10 are output in order in a period longer than one cycle of the horizontal synchronization signal within the period between the times t10 and t12, together with the scanning line selection signals 1 to 10, to thereby perform image display at a half frame frequency of the display panel.

In the case where the display mode switching is instructed during the display operation in the first display mode illustrated in FIG. 9, the shift to the second display mode is performed by way of the display operation in a display mode illustrated in FIG. 10, that is, the third display mode. Referring to FIG. 10, the third display mode is described in detail below.

As illustrated in FIG. 10, also in the third display mode, the frame frequency of the input display data to be input from the external device is not changed, and hence the input display data pieces 1 to 10 for 10 lines corresponding to each frame period are sequentially input for each frame period, which is represented by a period between times t30 and t31 or between times t31 and t33. In other words, in a one-frame period, the input display data for 10 lines is input.

On the other hand, as described above, the screen is displayed as being divided into the first display area and the second display area. During a two-frame period for input, the scanning line selection signals 4 to 7 are selected twice while the other scanning line selection signals are selected only once. The data voltages are synchronized with the respective scanning line selection periods of the scanning line selection signals so that the corresponding data voltage is applied to each line. In other words, during the two-frame period for input, the data voltage is applied twice to each of the lines 4 to 7.

In other words, as image display corresponding to the input display data that is input during the even-numbered frame period between the times t30 and t31, in the third display mode, the data voltages corresponding to the input display data pieces 1 to 10 are output in order in a period longer than one cycle of the horizontal synchronization signal within the period between the times t30 and t32, together with the scanning line selection signals 1 to 10, to thereby perform image display in the first display area. On the other hand, as image display corresponding to the input display data that is input during the subsequent frame period between the times t31 and t33, the data voltages corresponding to the input display data pieces 4 to 7 among the input display data pieces 1 to 10 are output in order in a period longer than one cycle of the horizontal synchronization signal within the period between the times t32 and t33, together with the scanning line selection signals 4 to 7, to thereby perform image display in the second display area. In the image display for the first display areas and the second display area performed in the period between the times t30 and t33, the areas corresponding to the scanning lines supplied with the scanning line selection signals 1 to 3 and the scanning line selection signals 8 to 10 serve as the first display areas, and the area corresponding to the scanning lines supplied with the scanning line selection signals 4 to 7 serves as the second display area. In other words, as is apparent from FIG. 10, the image display is performed in the first display area at a half one-frame frequency while the image display is performed in the second display area at a one-frame frequency.

It should be noted that the scanning line selection period in which one scanning line selection signal is selected is longer than one cycle of the horizontal synchronization signal. Further, the scanning line selection period in the third display mode is shorter than a scanning line selection period in the first display mode, and longer than a scanning line selection period in the second display mode.

In the second display mode by way of the above-mentioned third display mode, the image display is performed in the second display mode illustrated in FIG. 11. Referring to FIG. 11, the second display mode is described in detail below.

In the second display mode, the input display data that is input between times t20 and t21, which corresponds to a frame period in the case of the frame frequency of 120 Hz, is displayed during the period between the times t20 and t21. The period is equivalent to a frame period corresponding to the frame frequency of the second display mode. Similarly, the input display data that is input between the times t21 and t22 is displayed during a period between the times t21 and t22.

In other words, because the resolution in the vertical direction is 10 lines, the input display data pieces 1 to 10 corresponding to the input display data for 10 lines are input in synchronization with the horizontal synchronization signal during the period between the times t20 and t21, which is a one-frame period. Without being subjected to frame frequency conversion by the frame frequency conversion circuit, those input display data pieces 1 to 10 for 10 lines are output from the timing control circuit to the data line drive circuit sequentially as the data voltages during the one-frame period between the times t20 and t21. In this way, as image display corresponding to the input display data that is input between the times t20 and t21, in the second display mode, the data voltages corresponding to the input display data pieces 1 to 10 are output in order in the same cycle as the horizontal synchronization signal so that the scanning line selection signals 1 to 10 is also output in the same cycle as the horizontal synchronization signal, to thereby perform image display at the frame frequency of 120 Hz of the display panel. It should be noted that a selection period in which one scanning line selection signal is selected corresponds to one cycle of the horizontal synchronization signal.

Similarly, after the time t21, the input display data pieces 1 to 10 for 10 lines to be input during a one-frame period are output from the timing control circuit to the data line drive circuit without being subjected to the frame frequency conversion by the frame frequency conversion circuit, and then output sequentially as the data voltages during the one-frame period. Further, the scanning line selection signals 1 to 10 are output in the same cycle as the horizontal synchronization signal, to thereby perform the image display at the frame frequency of 120 Hz of the display panel.

If the scanning line selection period is set too short, the application time of the data voltage to each pixel (that is, the charge/discharge time of each pixel) becomes too short to allow a pixel potential to converge enough to a target value. Accordingly, in order to perform stable display, it is necessary to secure a scanning line selection period that is long enough for the pixel potential to converge. For example, as the frame frequency becomes higher, the scanning line selection period is required to be shorter, which makes more difficult to perform stable display. In other words, as the frame frequency becomes lower, the display is performed with more stability. Specifically, in the first display mode, the display is performed with more stability compared with the second display mode.

[Detailed Description of Third Display Mode]

Figure 12:
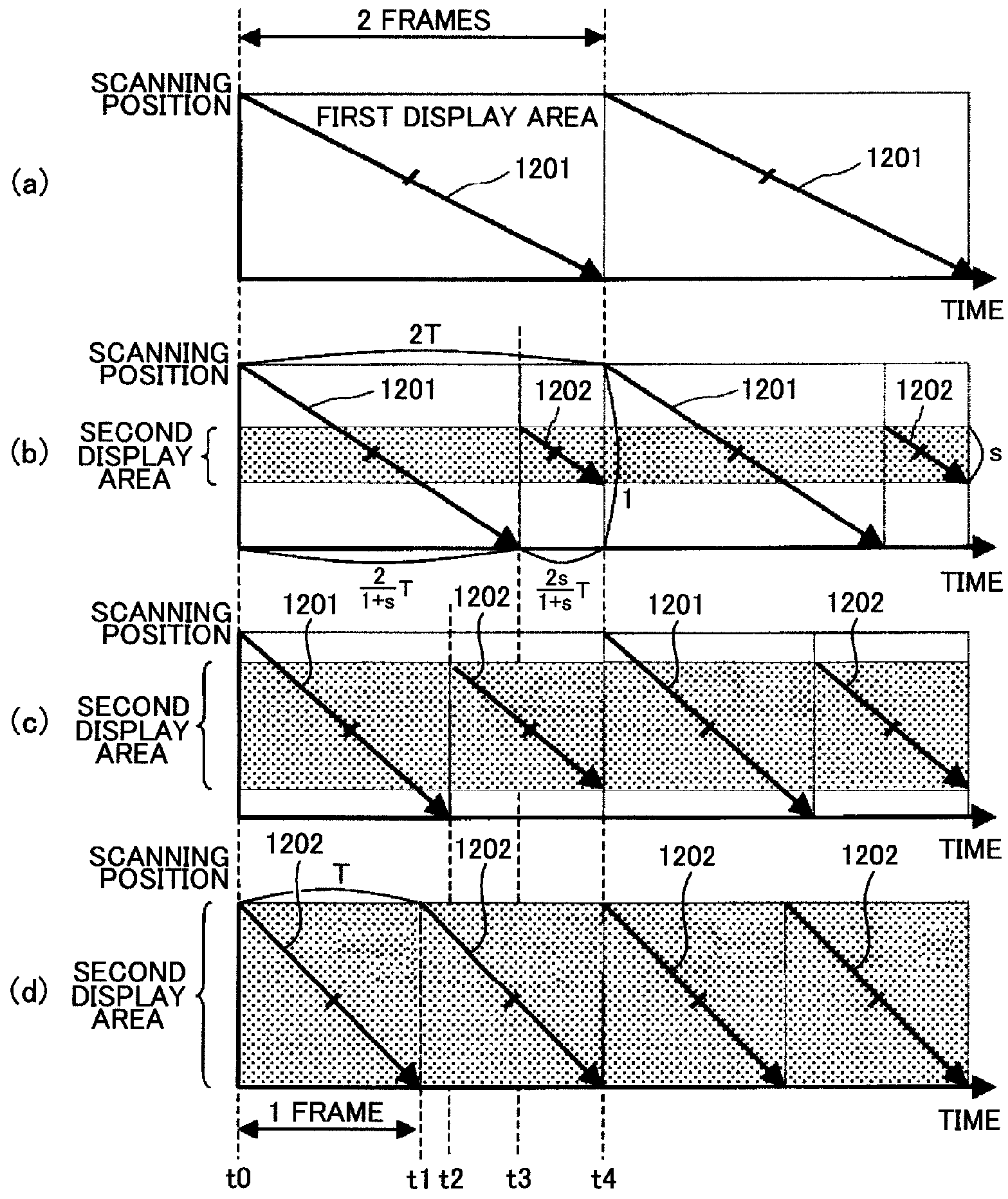
FIGS. 12(*a*) to 12(*d*) are diagrams illustrating scanning operations of scanning lines in the third display mode performed in the display device according to the first embodiment of the present invention.

FIGS. 12(*a*) to 12(*d*) are diagrams illustrating scanning operations of scanning lines in the third display mode performed in the display device according to the first embodiment of the present invention. Referring to FIGS. 12(*a*) to 12(*d*), a transition process of the scanning lines in the display device according to the first embodiment is described in detail below. In FIGS. 12(*a*) to 12(*d*), FIG. 12(*a*) illustrates the scanning operation of the scanning lines in the first display mode, FIGS. 12(*b*) and 12(*c*) each illustrate the scanning operation of the scanning lines in the third display mode (during display mode transition), and FIG. 12(*d*) illustrates the scanning operation of the scanning lines in the second display mode. The following description is directed to a case where a display mode is switched from the first display mode (60 Hz) to the second display mode (120 Hz). The following description is applicable to a case where a display mode is switched from the second display mode (120 Hz) to the first display mode (60 Hz) as long as the transition is reversed. In FIGS. 12(*a*) to 12(*d*), the horizontal axis represents time and the vertical axis represents a scanning position of selecting a scanning line.

Referring to FIGS. 12(*a*) to 12(*d*), the scanning operation of the scanning lines upon the input of the display mode switch signal to the parameter calculation circuit is described below.

In the first display mode before inputting the display mode switch signal (at the frame frequency of, for example, 60 Hz), as illustrated in FIG. 12(*a*), for example, input display data corresponding to even-numbered frames of the input display data to be input in a frame period (T period) corresponding to the frame frequency of 120 Hz is displayed as images in a period between times t0 and t4, which is a two-frame period (2T period), that is, in a frame cycle corresponding to the frame frequency of 60 Hz, by way of whole screen scanning from the upper portion toward the lower portion of the display panel as indicated by an arrow (vector) 1201. The whole screen scanning corresponds to the scanning operation of the scanning lines as described above with reference to FIG. 9, specifically, the operation of sequentially writing pixel voltages corresponding to display images into pixels arranged on the upper side of the display panel downward to pixels arranged on the lower side thereof.

When the display mode switch signal is input and the display mode is accordingly changed to the third display mode, as illustrated in FIG. 12(*b*), the period indicated by the arrow 1201 starting from the time t0, which is allocated to the image display of the even-numbered frames, is reduced to a period between the times t0 and t3. During the period between the times t3 and t4 saved as a result of the reduction, image display data corresponding to a partial region of a subsequent frame (odd-numbered frame) of the image display data is displayed as an image in a scanning region of the second display area (second display area shaded in FIG. 12(*b*)), which is indicated by an arrow 1202. At this time, in the display device according to the first embodiment, in order to reduce the calculation amount, a scanning (switch) rate of the scanning lines between the times t0 and t3 (which is represented by an inclination angle of the arrow 1201 of FIG. 12(*b*)) is the same as a scanning rate of the scanning lines between the times t3 and t4 (which is represented by an inclination angle of the arrow 1202 of FIG. 12(*b*)).

Here, in the case of using a combination of the display modes in which the frame frequency of the first display mode is ½ of the frame frequency of the second display mode, as illustrated in FIG. 12(*b*), for example, it is preferable that the first scanning of the whole screen between the times t0 and t3 be ended in a period of $2/(1+s)\times T$ and the scanning of the second display area between the times t3 and t4 be ended in a period of $2\,s/(1+s)\times T$, where a length of one frame is represented by T, and a ratio of the number of scanning lines of the second display area to the number of scanning lines of the whole screen is 1:s ($0\leq s\leq 1$).

In the third display mode, after a predetermined period has passed since the state illustrated in FIG. 12(*b*), as illustrated in FIG. 12(*c*), the period indicated by the arrow 1201 starting from the time t0, which is allocated to the image display of the even-numbered frames, is further reduced to a period between the times t0 and t2. During the period between the times t2 and t4 obtained as a result of the further reduction, image display data corresponding to a partial region of a subsequent frame (odd-numbered frame) of the image display data is displayed as an image in a scanning region of the second display area indicated by the arrow 1202.

After that, as illustrated in FIG. 12(*d*), the second display area constitutes the whole screen, and the third display mode is ended to enter the second display mode in which the image display of even-numbered frames is performed between the times t0 and t1 indicated by the arrow 1202 and the image display of odd-numbered frames is performed between the times t1 and t4 indicated by the arrow 1202. In other words, the switching to the image display to be performed at the same frame frequency as the frame frequency of the input display data is completed, and hence the whole screen scanning is performed in a one-frame period.

It should be noted that the description with reference to FIGS. 12(*a*) to 12(*d*) is directed to an exemplary shift of the display mode performed in four steps, but the shift may be performed in five or more steps. Alternatively, the shift may be performed in three or less steps. However, to carry out the smooth shift, the number of steps needs to be set not too small but to an appropriate one. Further, in the case where the horizontal axis and the vertical axis are defined as illustrated in FIGS. 12(*a*) to 12(*d*), vectors representing scanning positions with time are preferable to become substantially parallel between the first scanning of the whole screen and the scanning of the second display area (that is, the selected time period in the first scanning of the whole screen becomes substantially equal to the selected time period in the scanning of the second display area). This is because different selected time periods depending on locations may cause fluctuations in convergence of data voltages to lead to image quality degradation, such as unevenness.

Figure 13:
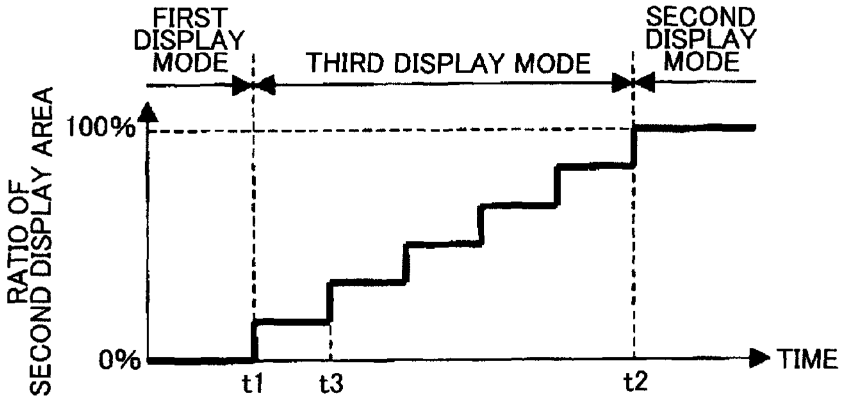
FIG. 13 is a graph illustrating a scanning operation of scanning lines, which is applicable to the display device according to the first embodiment of the present invention.

Regarding the scanning operation of the scanning lines performed on this occasion, as illustrated in FIG. 13, the ratio of the second display area is increased in steps during the third display mode period (transition period) between the times t1 and t2. Due to this operation, the ratio is increased for each period between the times t0 and t3 corresponding to the N-frame period in Step 640 of FIG. 7 described above. It should be noted that, in the case where the second display mode is switched to the first display mode, the ratio of the second display area is decreased in steps for each period between the times t0 and t3 during the third display mode period (transition period) between the times t1 and t2 illustrated in FIG. 13.

Figure 14:
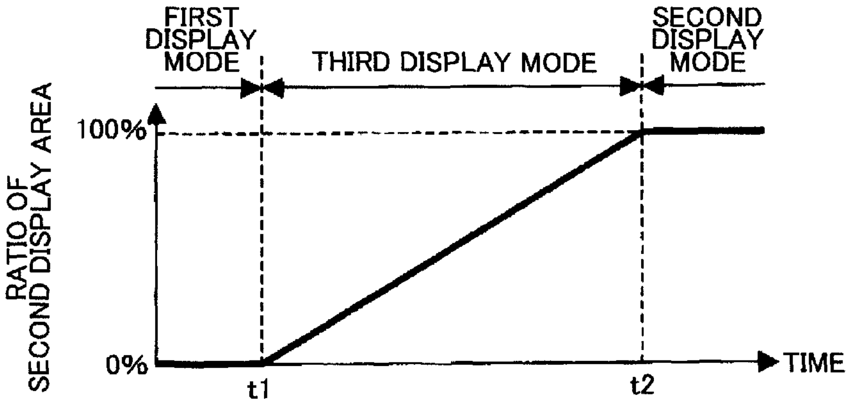
FIG. 14 is a graph illustrating another scanning operation of scanning lines, which is applicable to the display device according to the first embodiment of the present invention.
Figure 15:
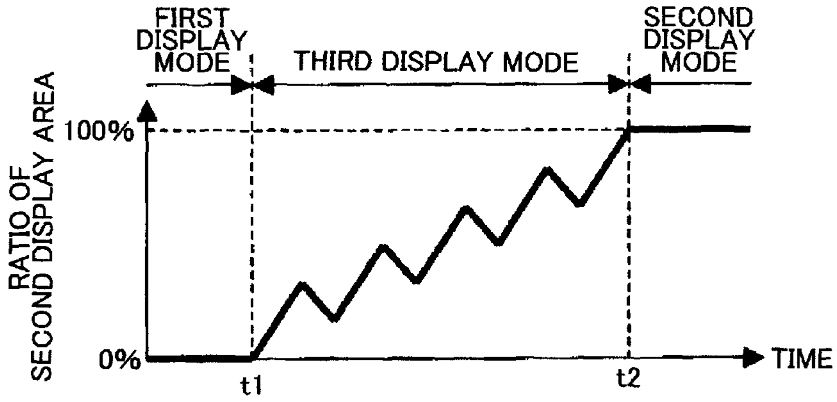
FIG. 15 is a graph illustrating still another scanning operation of scanning lines, which is applicable to the display device according to the first embodiment of the present invention.

It should be noted that the method involving how the second display area is increased in the third display mode period between the times t1 and t2 is not limited to the above. For example, as illustrated in FIG. 14, the ratio of the second display area may be increased gradually in a ramp waveform pattern. Alternatively, as illustrated in FIG. 15, the second display area may be increased in a sawtooth pattern, that is, the ratio of the second display area may be varied to be increased eventually. How the second display area is increased in the third display mode period is appropriately set taking into account the calculation amount of the control parameters, the amount of holding parameters, and the suppression of image quality degradation. How the second display area is increased in the third display mode period is not limited to the above, and other increase patterns may be employed.

DESCRIPTION OF EFFECT

As described above, the display device according to the first embodiment includes the parameter calculation circuit 570, and in switching the display mode, the parameter calculation circuit 570 outputs the necessary control parameters 571 and 572 to the frame frequency conversion circuit 580 and the timing control circuit 540, respectively, so that the image display area can be divided into an area for displaying an image in the display mode before the switching and an area for displaying an image in the switched display mode, and that the area for displaying an image in the switched display mode can be increased gradually. Accordingly, by means of the parameter calculation circuit 570, high-volume reading of the control parameter 561 from the parameter holding circuit 560 and the restart of the frame frequency conversion circuit 580 may be prevented, which are responsible for frame drops. As a result, image quality degradation, such as frame drops and flicker, can be prevented in switching the frame frequency of the display image.

Referring to FIG. 1 illustrating a schematic configuration of a conventional display device, description is given as to read processing of control parameters from a parameter holding circuit, computational processing made by a frame frequency conversion circuit, and a restart of a timing control circuit, which may be a cause of frame drops in the display mode switching.

As is apparent from FIG. 1, in the conventional display device, input display data 102 and an input control signal group 101 as well as a display mode switch signal 103 are input from an external device or the like to a frame frequency conversion circuit 180. As an input from a parameter holding circuit 160, the frame frequency conversion circuit 180 directly receives a control parameter 161 including a vertical synchronization signal frequency (equivalent to frame frequency), a horizontal synchronization signal frequency, a clock frequency, and the like, which are used for generating a frame-frequency-converted control signal group 181.

Further, in the conventional display device, a timing control circuit 140 directly receives as inputs the frame-frequency-converted control signal group 181 output from the frame frequency conversion circuit 180 and frame-frequency-converted display data 182 obtained by converting a frame frequency of the input display data 102, as well as the control parameter 161.

The timing control circuit 140 is further supplied with a free-running control signal group 151 from a free-running circuit 150. If the timing control circuit 140 detects an abnormality in the frame-frequency-converted control signal group 181 (for example, a lack of various input signals (vertical synchronization signal, horizontal synchronization signal, data effective period signal, clock signal, etc), a too-high frequency, a too-low frequency, etc), the timing control circuit 140 controls a data line drive circuit control signal group 141, output display data 142, and a scanning line drive circuit control signal group 143 so that a black screen may be displayed on a display panel 110 to prevent noise display.

Figure 2:
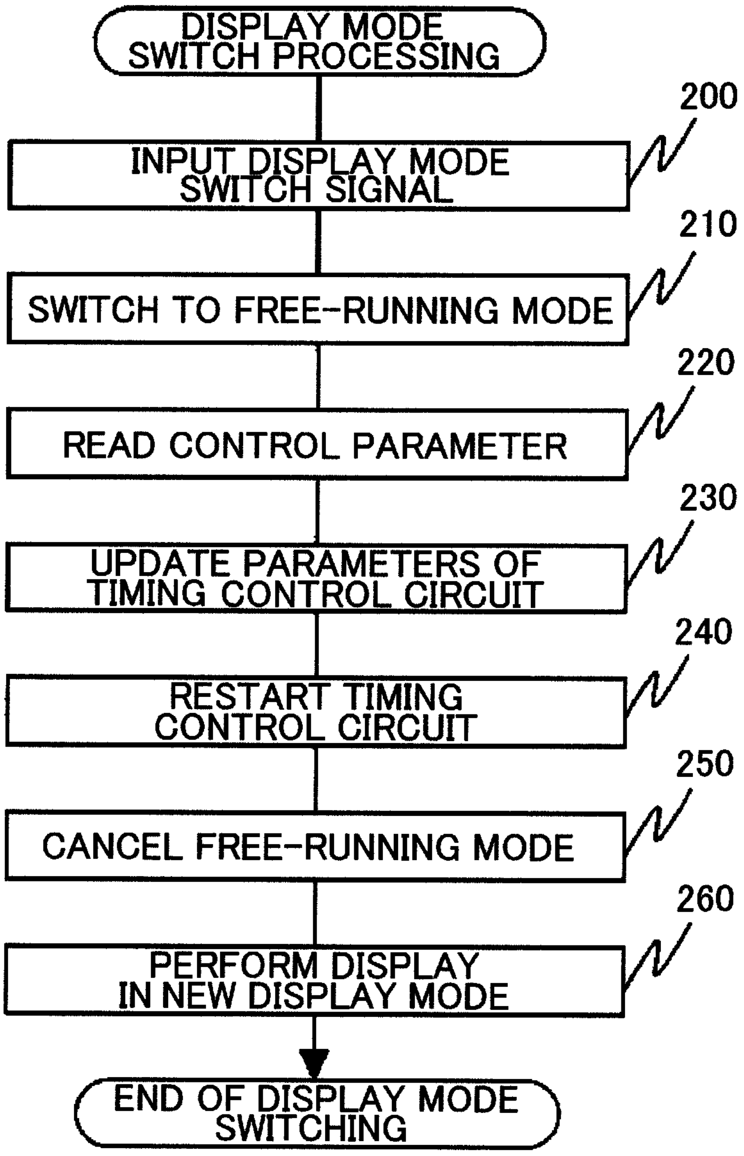
FIG.2 PRIOR ART
FIG. 2 is a flow chart illustrating an exemplary operation procedure of display mode switch processing performed in the conventional display device.
Figure 3:
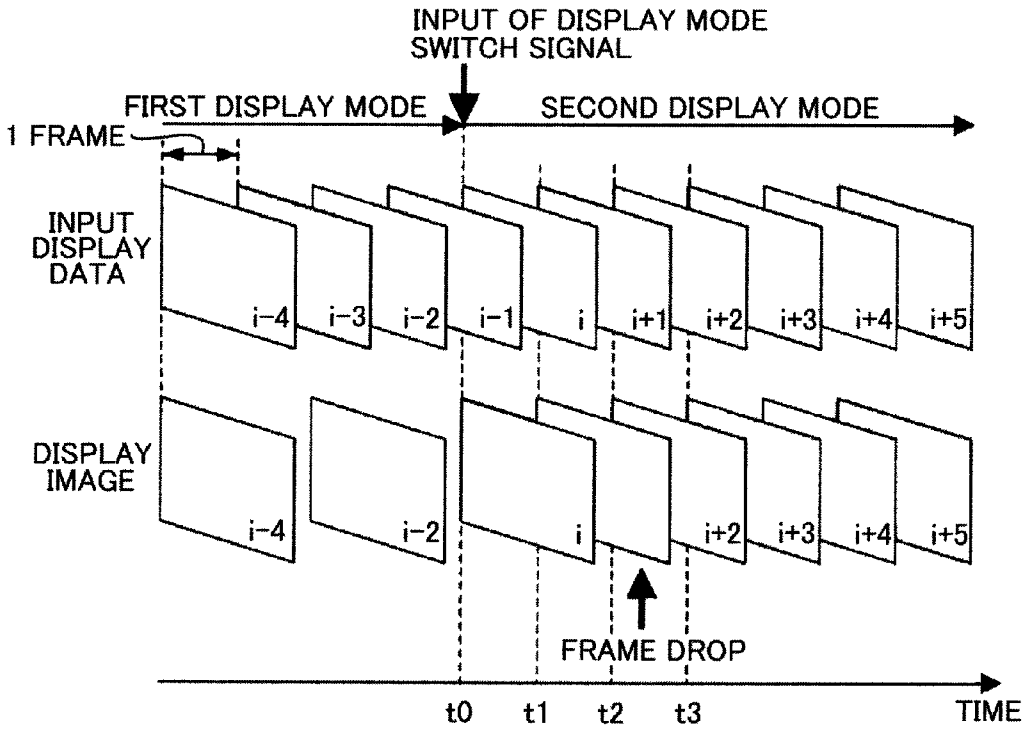
FIG.3 PRIOR ART
FIG. 3 is a conceptual diagram illustrating how a display mode switch operation is performed in the conventional display device.

FIG. 2 is a flow chart illustrating an exemplary operation procedure of display mode switch (frame frequency switch) processing performed in the conventional display device. FIG. 3 is a conceptual diagram illustrating how the display mode switch operation is performed in the conventional display device. Referring to FIG. 2 and FIG. 3, the display mode switch operation performed in the conventional display device is described below. It should be noted that, similarly to the above-mentioned first embodiment, FIG. 3 illustrates the display mode switch operation where the frame frequency of the first display mode is 60 Hz and the frame frequency of the second display mode is 120 Hz. Further, in the first display mode, only even-numbered frames of input display data are displayed as images, and in the second display mode, all pieces of the input display data are displayed as images.

First, in image display before a time t0, images of only the even-numbered frames of the input display data are output as display images.

Upon the input of the display mode switch signal at the time t0, the frame frequency conversion circuit 180 receives the input of the display mode switch signal (Step 200).

Subsequently, based on the display mode switch signal, the frame frequency conversion circuit 180 performs the display mode switch operation where the control parameter 161 is read from the parameter holding circuit 160 to update the timing control circuit 140. Until this processing is completed, the operation of the timing control circuit 140 is unstable, and normal screen display is not performed. Accordingly, in order to protect the display panel and avoid noise display, the display mode is shifted to the free-running mode (Step 210). Performing the free-running mode in Step 210 means that such a phenomenon that image display of the input display data indicated by the time t1 is temporarily ceased, that is, frame drops (including black screen display, unsteadiness of display, noise display, etc) occur.

Subsequently, the frame frequency conversion circuit 180 and the timing control circuit 140 read the control parameter 161 from the parameter holding circuit 160 (Step 220). It should be noted that it takes reasonable time to read the control parameter 161 from a memory forming the parameter holding circuit 160.

Subsequently, based on the control parameter 161, the frame frequency conversion circuit 180 generates the frame-frequency-converted control signal group 181 and the frame-frequency-converted display data 182 (Step 230).

Subsequently, the timing control circuit 140 is restarted (Step 240). It should be noted that it takes a given time to restart the timing control circuit 140.

After the operation of the timing control circuit 140 becomes stable in Step 240, the free-running mode is canceled (Step 250), and since the time t2, the display is performed in the new display mode designated by the display mode switch signal (Step 260).

In this case, how long the reading of the control parameter 161 from the parameter holding circuit 160 lasts depends on a reading rate of the memory and also on a data amount of the control parameter 161. Accordingly, as the data amount becomes larger, the reading time becomes longer to lead to a longer period of frame drops, which is not preferable in terms of comfort and usability for a user (viewer, observer) and image quality of the display device.

Second Embodiment

Figure 16:
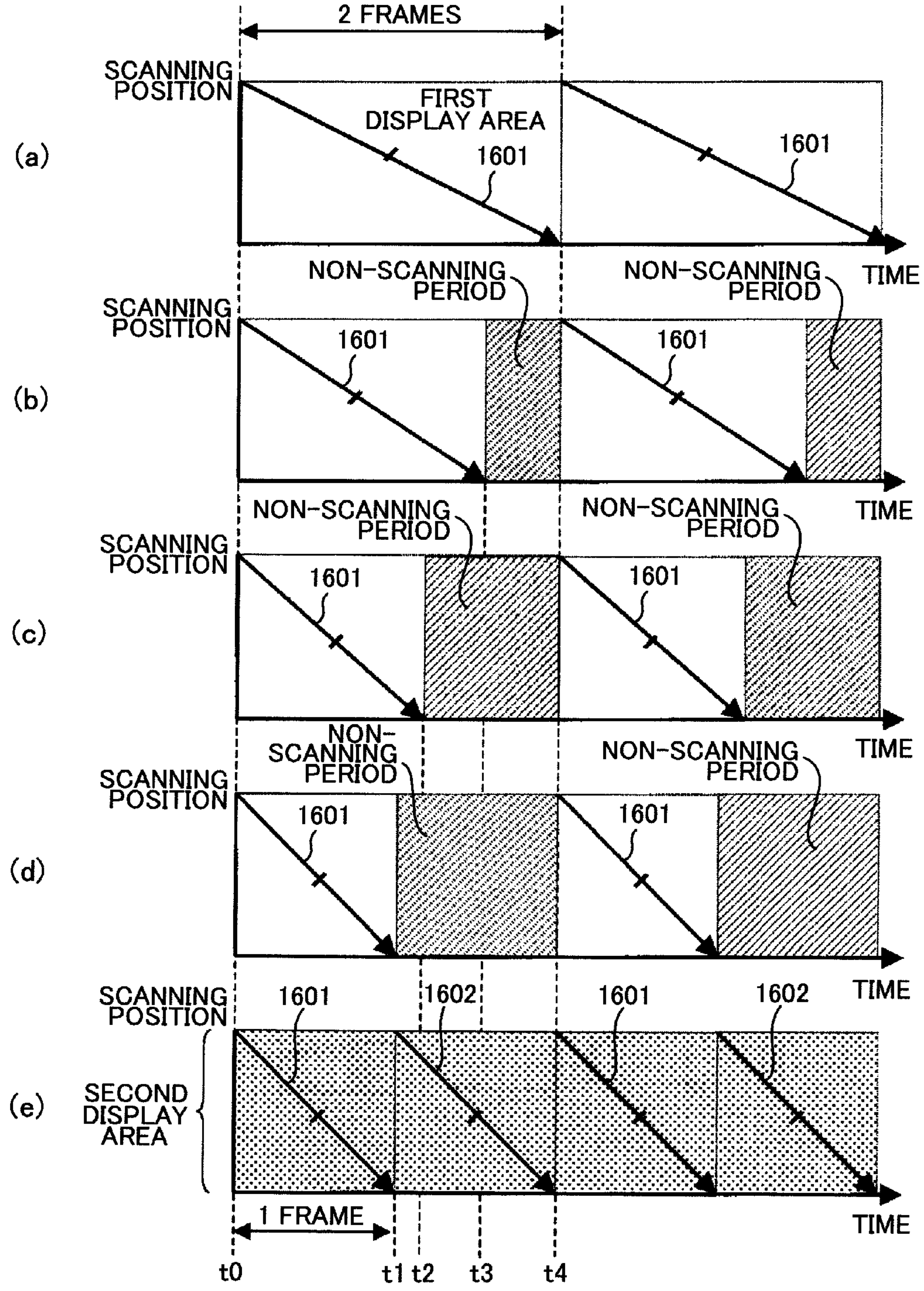
FIGS. 16(*a*) to 16(*e*) are diagrams illustrating scanning operations of scanning lines in a third display mode performed in a display device according to a second embodiment of the present invention.

FIGS. 16(*a*) to 16(*e*) are diagrams illustrating scanning operations of scanning lines in a third display mode performed in a display device according to a second embodiment of the present invention. FIG. 16(*a*) illustrates a scanning operation of the scanning lines in a first display mode, FIGS. 16(*b*) to 16(*d*) each illustrate the scanning operation of the scanning lines in the third display mode (during display mode transition), and FIG. 16(*e*) illustrates a scanning operation of the scanning lines in a second display mode. It should be noted that the display device according to the second embodiment has the same configuration as the display device according to the first embodiment except for a display method for the second display area in the third display mode. Therefore, in the following, detailed description is given of the scanning operation of the scanning lines in the third display mode. In FIGS. 16(*a*) to 16(*e*), the horizontal axis represents time and the vertical axis represents a scanning position of selecting a scanning line.

Referring to FIGS. 16(*a*) to 16(*e*), a transition process of the scanning lines in the display device according to the second embodiment is described in detail below. In FIGS. 16(*a*) to 16(*e*), the dotted portions indicate the scanning line positions corresponding to the second display area, and the shaded portions indicate non-dotted periods where no scanning is performed.

In the first display mode before the input of the display mode switch signal (at the frame frequency of, for example, 60 Hz), as illustrated in FIG. 16(*a*), for example, input display data corresponding to even-numbered frames of the input display data to be input in a frame period (T period) corresponding to the frame frequency of 120 Hz is displayed as images in a period between times t0 and t4, which is a two-frame period (2T period), that is, in a frame cycle corresponding to the frame frequency of 60 Hz, by way of whole screen scanning from the upper portion toward the lower portion of the display panel as indicated by an arrow (vector) 1601.

When the display mode switch signal is input and the display mode is accordingly changed to the third display mode, as illustrated in FIG. 16(*b*), the period indicated by the arrow 1601 starting from the time t0, which is allocated to the image display of the even-numbered frames, is reduced to a period between the times t0 and t3. The period between the times t3 and t4 that results from the reduction is a non-scanning period where no image update is performed.

In the third display mode, after a predetermined period has passed since the state illustrated in FIG. 16(*b*), as illustrated in FIG. 16(*c*), the period indicated by the arrow 1601 starting from the time t0, which is allocated to the image display of the even-numbered frames, is further reduced to a period between the times t0 and t2. Similarly to FIG. 16(*b*), the period between the times t2 and t4 saved as a result of the further reduction is a non-scanning period where no image update is performed.

In the third display mode, after another predetermined period has elapsed since the state illustrated in FIG. 16(*c*), as illustrated in FIG. 16(*d*), the period between the times t0 and t1 indicated by the arrow 1601 starting from the time t0, which is allocated to the image display of the even-numbered frames, becomes a one-frame period, that is, the period between the times t1 and t4 becomes a one-frame period. At this time, as illustrated in FIG. 16(*e*), image display is performed so as to correspond to the input display data between the times t1 and t4. As a result, the whole screen is displayed as the second display area, that is, the whole screen is scanned at the frame frequency of 120 Hz, and hence the same effect as in the display device according to the first embodiment can be obtained.

It should be noted that the display device according to the second embodiment shifts the display mode in five steps, but the number of steps is not limited thereto. The shift may be performed in six or more steps. Alternatively, the shift may be performed in four or less steps. However, to carry out the smooth shift, the number of steps needs to be set to an appropriate one.

When the first display mode is shifted to the second display mode, a selection period of a scanning line is reduced gradually. According to the reduction, a non-scanning period where no scanning is performed is increased gradually (FIG. 16(*a*)→FIG. 16(*b*)→FIG. 16(*c*)→FIG. 16(*d*)).

Then, at the time when the scanning line selection period becomes equivalent to that of the second display mode, which is illustrated in FIG. 16(*d*), the scanning is performed for odd-numbered frames to shift the display mode to the second display mode (FIG. 16(*d*)→FIG. 16(*e*)).

Conversely, when the second display mode is shifted to the first display mode, the scanning for the odd-numbered frames is suspended at first (FIG. 16(*e*)→FIG. 16(*d*)). Next, the selection period of the scanning line is increased gradually. Correspondingly to the increase, the non-scanning period is reduced gradually (FIG. 16(*d*)→FIG. 16(*c*)→FIG. 16(*b*)→FIG. 16(*a*)). Consequently, one screen is scanned spending a two-frame period, and the shift to the first display mode is completed.

Third Embodiment

Figure 17:
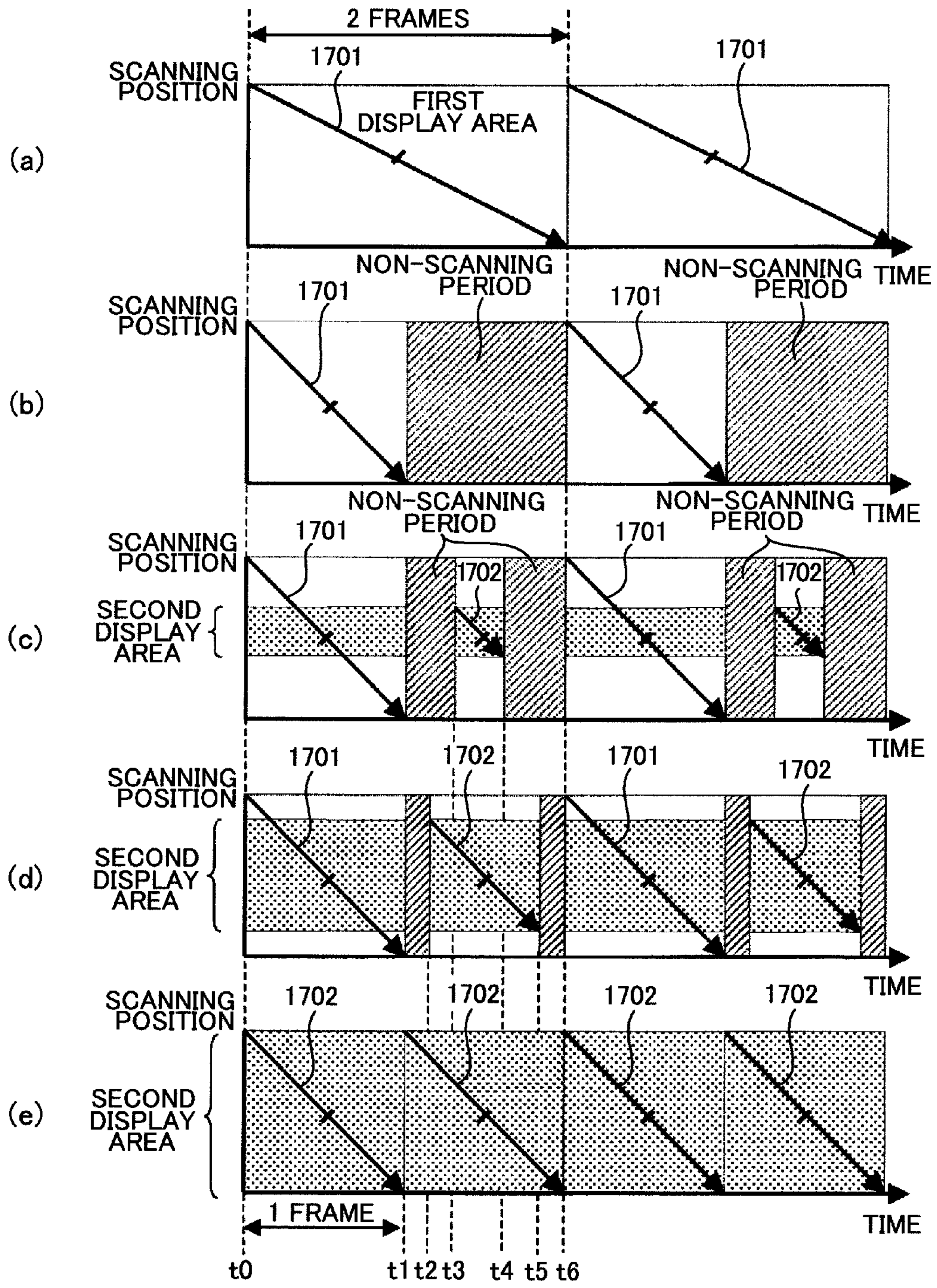
FIGS. 17(*a*) to 17(*e*) are diagrams illustrating scanning operations of scanning lines in a third display mode performed in a display device according to a third embodiment of the present invention.

FIGS. 17(*a*) to 17(*e*) are diagrams illustrating scanning operations of scanning lines in a third display mode performed in a display device according to a third embodiment of the present invention. FIG. 17(*a*) illustrates a scanning operation of the scanning lines in a first display mode, FIGS. 17(*b*) to 17(*d*) each illustrate the scanning operation of the scanning lines in the third display mode (during display mode transition), and FIG. 17(*e*) illustrates a scanning operation of the scanning lines in a second display mode. It should be noted that the display device according to the third embodiment has the same configuration as the display device according to the first embodiment except for a display method for the second display area in the third display mode. Therefore, in the following, detailed description is given as to the scanning operation of the scanning lines in the third display mode. In FIGS. 17(*a*) to 17(*e*), the horizontal axis represents time and the vertical axis represents a scanning position of selecting a scanning line.

Referring to FIGS. 17(*a*) to 17(*e*), a transition process of the scanning lines in the display device according to the third embodiment is described in detail below. In FIGS. 17(*a*) to 17(*e*), the dotted portions indicate the scanning line positions corresponding to the second display area, and the hatched portions indicate non-scanning periods where no scanning is performed.

In the first display mode before the input of the display mode switch signal (at the frame frequency of, for example, 60 Hz), as illustrated in FIG. 17(*a*), for example, input display data corresponding to even-numbered frames of the input display data to be input in a frame period (T period) corresponding to the frame frequency of 120 Hz is displayed as images in a period between times t0 and t6, which is a two-frame period (2T period), that is, in a frame cycle corresponding to the frame frequency of 60 Hz, by way of whole screen scanning from the upper portion toward the lower portion of the display panel as indicated by an arrow (vector) 1701.

When the display mode switch signal is input and the display mode is accordingly changed to the third display mode, as illustrated in FIG. 17(*b*), at first, a selection period of a scanning line becomes the same as a selection period of the second display mode, and the latter one-frame period is set to the non-scanning period. In other words, the two-frame period between the times t0 and t6 is divided into a one-frame period between the times t0 and t1 and a one-frame period between the times t1 and t6, and then the one-frame period between the times t1 and t6 is set to the non-scanning period so that no image update is performed.

Accordingly, the period indicated by the arrow 1701 starting from the time t0, which is allocated to the image display of the even-numbered frames, is reduced to the period between the times t0 and t1. During the period between the times t0 and t1 that results from the reduction, the whole screen is scanned to perform image display of the even-numbered frames.

In the third display mode, after a predetermined period has passed after the state illustrated in FIG. 17(*b*), as illustrated in FIG. 17(*c*), the whole screen is scanned during the period between the times t0 and t1 indicated by the arrow 1701, and image display data corresponding to a partial region of a subsequent frame (odd-numbered frame) of the image display data is displayed as an image during a period between the times t3 and t4 in a scanning region of the second display area indicated by an arrow 1702.

In the third display mode, after another predetermined period has elapsed since the state illustrated in FIG. 17(*c*), as illustrated in FIG. 17(*d*), the whole screen is scanned during the period between the times t0 and t1 indicated by the arrow 1701, and image display data corresponding to a partial region of a subsequent frame (odd-numbered frame) of the image display data is displayed as an image during a period between the times t2 and t5 in a scanning region of the second display area indicated by the arrow 1702.

After that, as illustrated in FIG. 17(*e*), the second display area constitutes the whole screen, and the third display mode is ended to enter the second display mode in which the image display (whole screen scanning) of even-numbered frames is performed between the times t0 and t1 indicated by the arrow 1702 and the image display (whole screen scanning) of odd-numbered frames is performed between the times t1 and t6 indicated by the arrow 1702. In other words, the switching to the image display to be performed at the same frame frequency as the frame frequency of the input display data is completed, and hence the whole screen scanning is performed in a one-frame period. As a result, the whole screen is displayed as the second display area, that is, the whole screen is scanned at the frame frequency of 120 Hz, and hence the same effect as in the display device according to the first embodiment can be obtained.

It should be noted that the description of the display device according to the third embodiment is directed to an exemplary shift of the display mode performed in five steps, but the shift may be performed in six or mode steps. Alternatively, the shift may be performed in four or less steps. However, to carry out the smooth shift, the number of steps needs to be set to an appropriate one.

In shifting the first display mode to the second display mode, the operation makes a transition in order of FIG. 17(*a*)→FIG. 17(*b*)→FIG. 17(*c*)→FIG. 17(*d*)→FIG. 17(*e*). Conversely, in shifting the second display mode to the first display mode, the operation makes a transition in order of FIG. 17(*e*)→FIG. 17(*d*)→17(*c*)→FIG. 17(*b*)→FIG. 17(*a*).

According to the display device of the third embodiment, when the first display mode is shifted to the second display mode, a selection period of a scanning line is the same as in the second display mode at first (FIG. 17(*a*)→FIG. 17(*b*)). At this time, the non-scanning period corresponds to one frame.

Next, the scanning of even-numbered frames starts to gradually increase the second display area (FIG. 17(*b*)→FIG. 17(*c*)→FIG. 17(*d*)→FIG. 17(*e*)).

Finally, the second display area has the same size as that of the whole screen, and the shift to the second display mode is completed.

In contrast, when the second display mode is shifted to the first display mode, the size of the second display area is reduced gradually with the selection period of the scanning line unchanged (FIG. 17(*e*)→FIG. 17(*d*)→FIG. 17(*c*)→FIG. 17(*b*)). At a time when the second display area is eliminated finally (FIG. 17(*b*)), the selection period of the scanning line is set to have the same length as in the first display mode so that the whole screen can be scanned spending a two-frame period, to thereby complete the shift to the first display mode (FIG. 17(*b*)→FIG. 17(*a*)).

Fourth Embodiment

Figure 18:
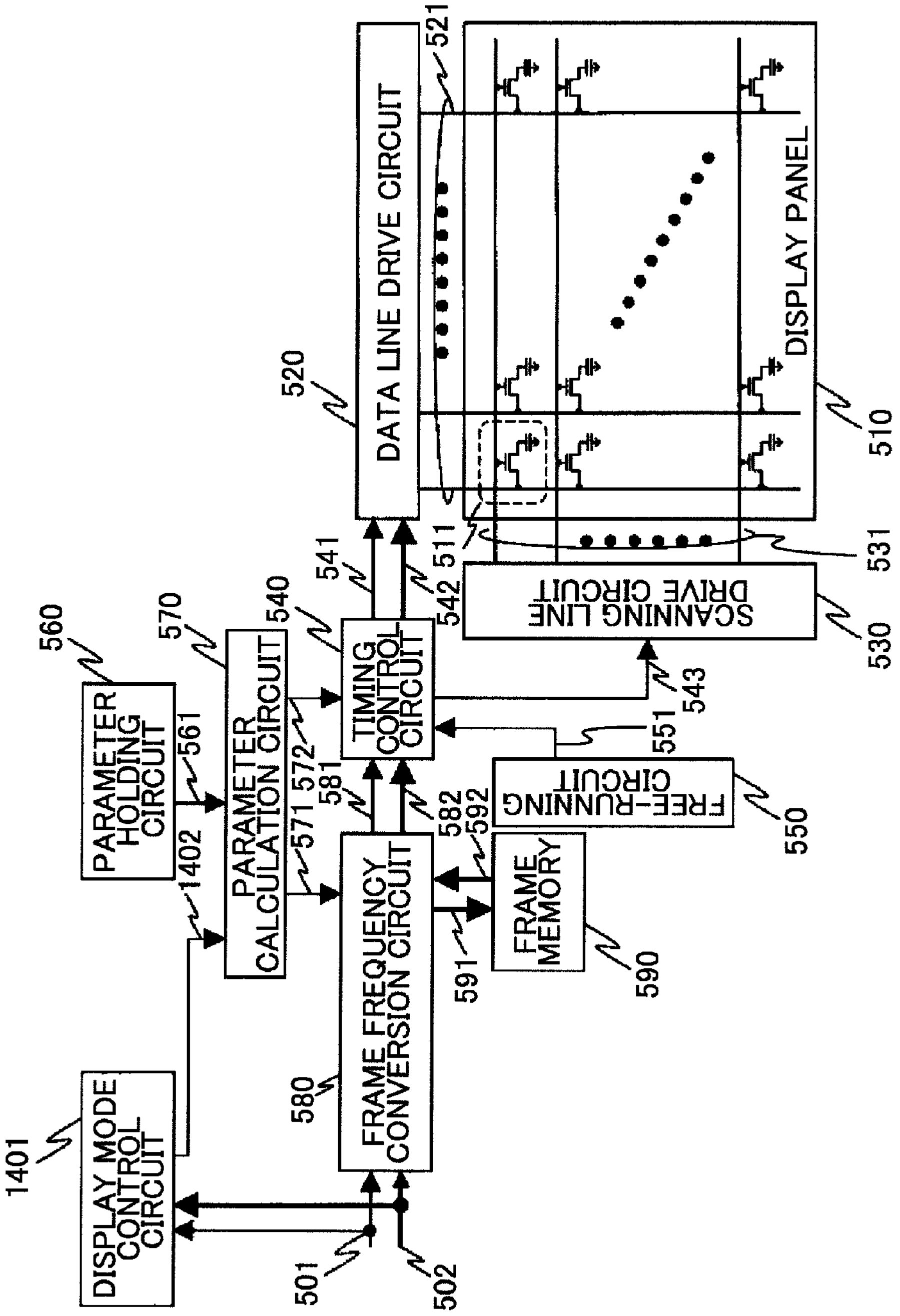
FIG. 18 is a diagram illustrating a schematic configuration of a display device according to a fourth embodiment of the present invention.

FIG. 18 is a diagram illustrating a schematic configuration of a display device according to a fourth embodiment of the present invention. Referring to FIG. 18, an overall configuration and an operation of the display device according to the fourth embodiment are described below. It should be noted that the display device according to the fourth embodiment has the same configuration as the display device according to the first embodiment except for a display mode control circuit 1401 and a display data switch signal 1402 that is generated by the display mode control circuit 1401 are supplied to the parameter calculation circuit 570. Therefore, in the following, detailed description is given as to the display mode control circuit 1401.

As is apparent from FIG. 18, the display device according to the fourth embodiment includes the display mode control circuit 1401. The input control signal group 501 and the input display data 502, which are input from an external device (not shown) to the frame frequency conversion circuit 580, are branched to be supplied to the display mode control circuit 1401 according to the fourth embodiment. Further, the display data switch signal 1402 is output from the display mode control circuit 1401 and supplied to the parameter calculation circuit 570. Here, based on the control parameter 561 from the parameter holding circuit 560, the parameter calculation circuit 570 outputs the control parameter 571 used for frame frequency conversion to the frame frequency conversion circuit 580, and outputs the control parameter 572 used for display timing control to the timing control circuit 540. In other words, in the display device according to the fourth embodiment, display mode switching can be performed by the display device itself, which is performed by means of the external device in the first embodiment.

The display mode control circuit 1401 according to the fourth embodiment detects, for example, the magnitude of image motion based on characteristics of the input display data 502, and outputs the display data switch signal 1402 in accordance with the result of the detection, to thereby switch the display mode. For example, an area for displaying a high-speed motion image is set to the second display mode while an area for displaying a low-speed motion image or a still image is set to the first display mode. This setting produces such a special effect that both the reduced motion blur and the reduced power consumption can be obtained, in addition to the above-mentioned effect obtained by the display device according to the first embodiment.

It should be noted that the display mode control circuit 1401 according to the fourth embodiment outputs the display data switch signal 1402 based on the input control signal group 501 and the input display data 502, but the configuration of the display mode control circuit 1401 is not limited thereto. For example, a well-known circuit for detecting a temperature change inside/outside the display device or a change in power consumption of built-in circuitry can be formed in the display mode control circuit 1401 so that the frame frequency may be switched in accordance with the temperature change inside/outside the display device or the change in power consumption of built-in circuitry, in addition to the image characteristics of the input display data.

For example, when an environment temperature of the display device is low, the display device operates at a reduced frame frequency and then operates at an increased frame frequency after the temperature of the device rises. Accordingly, for example, in a display device using a liquid crystal panel, a frame frequency can be adjusted appropriately in accordance with temperature dependency of a response speed of liquid crystal, and hence an excellent image quality with little noise, such as motion blur, can be obtained independently of the environment temperature.

In a case where the display device is used in applications such as an ordinary home-use television set, the temperature change inside/outside the device is relatively small, whereas in a case where the display device is used in applications as being installed on a movable object such as a vehicle or an aircraft, the temperature change inside/outside the device is significantly large. When the display device according to the fourth embodiment is used in such applications for movable objects, the smooth shift to an appropriate frame frequency can be performed.

Further, the display device can be configured to observe a temperature increase or power consumption of electronic components or the like inside the display device, and reduce a frame frequency when the electronic components are heated to exceed a predetermined value or the power consumption increases. Such process protects the display device from being broken due to overheat and overcurrent, leading to a reduction in consumption power.

Further, for example, the characteristics of the input display data can be extracted so that the frame frequency can be changed in accordance with the extracted characteristics. An example of the characteristics of the input display data includes the magnitude of image motion. For example, when a high-speed motion image is input, the frame frequency is increased, whereas the frame frequency is decreased when a still image or a low-speed motion image is input. Accordingly, both the improvement of motion blur and the reduction in power consumption can be obtained in a balanced way.

As the characteristics of the input display data, a specific geometric pattern may be detected, such as solid-pattern display, checked-pattern display, or horizontal/vertical striped-pattern display. Depending on a display device configuration, when a specific geometric pattern is input, image quality degradation such as coloring, unevenness, or after-image may occur in a display image, or individual portions of the device may overheat (a geometric pattern causing such a trouble is referred to as a the worst pattern). When such a worst pattern is input as input display data, the display device is capable of switching a frame frequency so as to mitigate such a problem.

Fifth Embodiment

Figure 19:
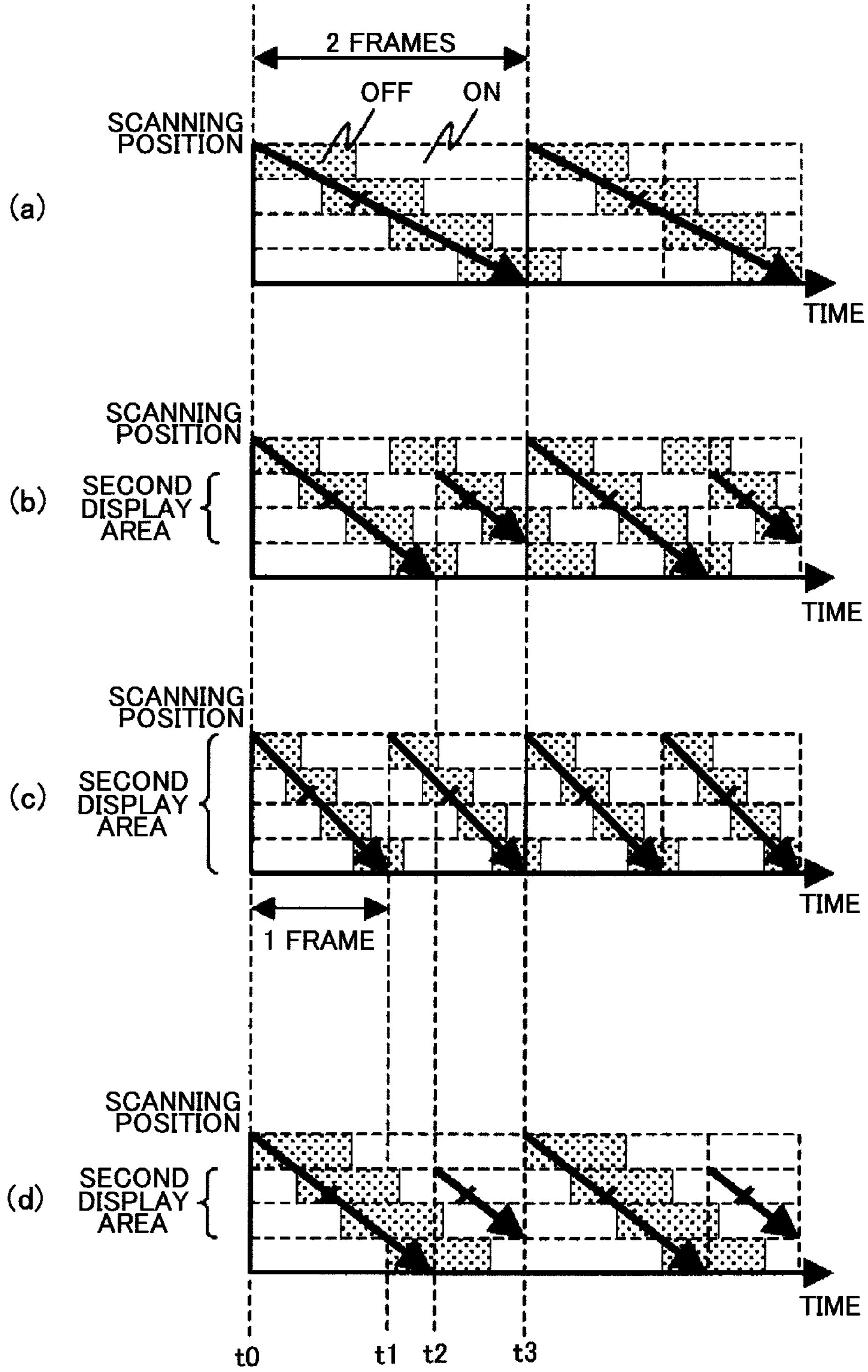
FIGS. 19(*a*) to 19(*d*) are diagrams illustrating scanning operations of scanning lines and backlight control operations in a third display mode performed in a display device according to a fifth embodiment of the present invention.

FIGS. 19(*a*) to 19(*d*) are diagrams illustrating scanning operations of scanning lines and backlight control operations in a third display mode performed in a display device according to a fifth embodiment of the present invention. In particular, FIG. 19(*a*) illustrates an exemplary operation of scanning type intermittent lighting drive in a first display mode, FIG. 19(*b*) illustrates an exemplary operation of the scanning type intermittent lighting drive in the third display mode, FIG. 19(*c*) illustrates an exemplary operation of the scanning type intermittent lighting drive in a second display mode, and FIG. 19(*d*) illustrates another exemplary operation of the scanning type intermittent lighting drive in the third display mode. It should be noted that the display device according to the fifth embodiment has the same configuration as the display device according to the first embodiment except for a backlight lighting method in the third display mode. Therefore, in the following, detailed description is given as to a backlight lighting operation associated with the scanning operation of the scanning lines in the third display mode. In FIGS. 19(*a*) to 19(*d*), the horizontal axis represents time and the vertical axis represents a scanning position at which a scanning line is selected.

A display panel of the display device according to the fifth embodiment is a liquid crystal display panel including a plurality of direct type backlights that are arranged in a direction parallel to the scanning lines. In the display device according to the fifth embodiment, the backlights are controlled to be sequentially flashed in synchronization with scanning signals, to thereby obtain display characteristics in the case of using the liquid crystal display panel similar to those of the impulse type.

Referring to FIGS. 19(*a*) to 19(*d*), the backlight flash operations adapted to the first to third display modes are described below. In FIGS. 19(*a*) to 19(*d*), the dotted portions represent turn-off periods of respective backlight areas, and the non-dotted portions represent turn-on periods thereof. In the display device according to the fifth embodiment, the backlights are arranged in four areas divided in the vertical direction.

As illustrated in FIG. 19(*a*), when a whole screen is scanned for display in a two-frame period between times t0 and t3 in the first display mode, in synchronization with the scanning of the scanning signals, the backlights are sequentially turned off from the upper one to the lower one for a predetermined period repeatedly with the two-frame period set as one cycle, to thereby perform the intermittent lighting drive of the backlights corresponding to pixels in which pixel data is being written. Accordingly, the impulse type display characteristics can be obtained in the display device adapted to the first display mode.

Further, as illustrated in FIG. 19(*b*), in the third display mode (transition period) where a screen is constituted by mixing the first display area and the second display area, the backlights are driven to be intermittently turned on in synchronization with both the scanning corresponding to the second display area and the scanning corresponding to the first display area. Accordingly, image quality degradation such as brightness unevenness, which results from different backlight lighting methods between the first display area and the second display area, can be prevented.

In other words, in the third display mode illustrated in FIG. 19(*b*), the backlights are driven to be intermittently turned on in synchronization with the screen scanning with respect to the first display area, which is indicated by an arrow between the times t0 and t2, and the screen scanning with respect to the second display area, which is indicated by an arrow between the times t2 and t3.

Further, as illustrated in FIG. 19(*c*), when a whole screen is scanned for display in a one-frame period between the times t0 and t1 in the second display mode, in synchronization with the scanning of the scanning signals, the backlights are sequentially turned off from the upper one to the lower one for a predetermined period repeatedly with the one-frame period set as one cycle, to thereby perform the intermittent lighting drive of the backlights corresponding to pixels in which pixel data is being written. Accordingly, the impulse type display characteristics can be obtained in the display device adapted to the second display mode.

As illustrated in FIG. 19(*d*), in the third display mode, the backlights may be turned on/off in synchronization with scanning of even-numbered frames between the times t0 and t2, and the flash operation of the backlights may be omitted during scanning of odd-numbered frames. In this case, the same backlight lighting method is used for the first display area and the second display area, and hence the image quality degradation, such as brightness unevenness, may be prevented.

As described above, according to the display device of the fifth embodiment, the scanning type intermittent lighting drive of the backlights is performed in synchronization with the scanning of the liquid crystal display panel. Accordingly, when the frame frequency is switched because of the shift of the display mode, a flash frequency of the backlight is changed in synchronization with the frame frequency. Further, a standby period from the scanning of the liquid crystal display panel to the lighting of the backlight in an area corresponding to the scanning is changed as well. This prevents image quality degradation (motion blur, coloring, brightness unevenness, etc) due to loss of synchronization between the scanning of the liquid crystal display panel and the intermittent lighting of the backlight.

Instead of the scanning type intermittent lighting drive, intermittent lighting drive of a type that turns on the whole backlights at a time may be used for the backlights of the liquid crystal display panel. Also in this case, it is preferable to change the flash frequency of the backlight and the standby period from the scanning of the liquid crystal display panel to the lighting of the backlight in accordance with the change in frame frequency of the display mode.

In the fifth embodiment, each scanning is followed by performing at least once the operation of turning on a backlight in an area corresponding to scanning of the display device after a while since the scanning and of turning off the backlight after another while.

The invention devised by the inventors of the present invention has been specifically described above by way of the above-mentioned embodiments of the invention. However, the present invention is not limited to the above-mentioned embodiments of the invention, and various modifications may be made thereto without departing from the scope of the invention.

What is claimed is:

1. A display device for displaying an image corresponding to input display data that is inputted from an external device, the display device comprising:

- a display panel including a plurality of pixels arrayed therein;
- a first drive circuit configured to output a display signal corresponding to the input display data to each of the plurality of pixels;
- a second drive circuit configured to output a selection signal to each of the plurality of pixels, the selection signal selecting the plurality of pixels supplied with the display signal;
- a frame frequency conversion circuit configured to convert a frame frequency of the input display data according to a mode switch signal; and
- a timing control circuit configured to control the first drive circuit and the second drive circuit based on the frame frequency after the conversion,
- wherein the display device generates at least two display areas on the display panel according to the mode switch signal, the at least two display areas displaying images at different frame frequencies,
- wherein the display device further comprises a switch unit configured to display an image at the frame frequency before the conversion at one of the at least two display areas and configured to display an image at the frame frequency after the conversion at another one of the at least two display areas, and wherein at least one of a boundary position and a size of the at least two display areas varies with time; and wherein the at least one of the boundary position and the size of each of the one of the at least two display areas and the another one of the at least two display areas, is varied based on one of power consumption of the display device and power consumption of electronic circuitry constituting the display device, and wherein the at least one of the boundary position and the size of each of the one of the at least two display areas and the another one of the at least two display areas is varied based on at least one of a temperature of the display panel and an environment temperature of the display device.

2. The display device according to claim 1, wherein the switch unit controls the timing control circuit so that only the input display data corresponding to the another one of the at least two display areas is generated as an image adapted to the frame frequency after the conversion.

3. The display device according to claim 1, wherein an image is displayed using one of:

a first display mode displaying an image at the frame frequency before the conversion;

a second display mode displaying an image at the frame frequency after the conversion; and a third display mode generating, on the display panel, a first display area for displaying an image at the frame frequency before the conversion and a second display area for displaying an image at the frame frequency after the conversion, and displaying the images at the frame frequency before the conversion and the frame frequency after the conversion corresponding thereto, respectively, and wherein the first display mode and the second display mode are switched via the third display mode.

4. The display device according to claim 3, wherein, in the third display mode, at least one of a boundary position and a size of the first display area and the second display area varies with the time in at least two steps.

5. The display device according to claim 3, wherein the first display mode and the second display mode have different lengths of selection periods in which the selection signal selects the one of the plurality of pixels, and wherein the third display mode has a selection period that is equal to or shorter than the selection period in the first display mode, and equal to or longer than the selection period in the second display mode.

6. The display device according to claim 3, wherein the display panel comprises:

a liquid crystal layer;

a liquid crystal display panel configured to control an amount of transmitted light by applying a voltage via the liquid crystal layer; and a backlight device configured to illuminate the liquid crystal display panel with backlight from a rear surface side thereof, wherein the display device further comprises means for controlling the backlight device to be turned on/off in synchronization with scanning of the liquid crystal display panel, and wherein the backlight device has at least one of a turn-on/off frequency, a turn-on timing, and a turn-off timing, which are changed in accordance with each of the first display mode, the second display mode, and the third display mode.

7. The display device according to claim 1, wherein the at least one of the boundary position and the size of each of the one of the at least two display areas and the another one of the at least two display areas is varied in accordance with a characteristic of the input display data.

8. The display device according to claim 7, wherein the characteristic of the input display data comprise whether the input display data is a still image or a moving image, or contains both a still image part and a moving image part.

9. The display device according to claim 7, wherein the characteristic of the input display data comprise whether or not the input display data contains a specific geometric pattern.

* * * * *